United States Patent
Lee et al.

(10) Patent No.: US 11,510,206 B2
(45) Date of Patent: Nov. 22, 2022

(54) METHOD AND APPARATUS FOR SELECTIVE ENERGY TRANSMISSION IN WIRELESS NETWORK

(71) Applicant: RESEARCH & BUSINESS FOUNDATION SUNGKYUNKWAN UNIVERSITY, Suwon-si (KR)

(72) Inventors: Tae-Jin Lee, Suwon-si (KR); Kwan Young Moon, Suwon-si (KR); Yun Min Kim, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 233 days.

(21) Appl. No.: 16/696,006

(22) Filed: Nov. 26, 2019

(65) Prior Publication Data

US 2020/0205158 A1 Jun. 25, 2020

(30) Foreign Application Priority Data

Dec. 24, 2018 (KR) .......................... 10-2018-0168677

(51) Int. Cl.
*H04L 5/00* (2006.01)
*H04W 72/04* (2009.01)
(Continued)

(52) U.S. Cl.
CPC ....... *H04W 72/0473* (2013.01); *H04L 5/0055* (2013.01); *H04W 52/0261* (2013.01);
(Continued)

(58) Field of Classification Search
CPC ............ H04L 5/0055; H04W 52/0261; H04W 72/0446; H04W 74/0808; H04W 88/10; H04W 72/0473
(Continued)

(56) References Cited

U.S. PATENT DOCUMENTS

2011/0292921 A1* 12/2011 Hunter .................... H04L 69/14
370/338
2016/0044608 A1* 2/2016 Denic ............... H04W 52/0219
370/315
(Continued)

FOREIGN PATENT DOCUMENTS

KR 10-2018-0000290 A 1/2018

OTHER PUBLICATIONS

Moon, Kwanyoung et al., "Selective Energy Request of device in Energy-harvesting WLAN", *Proceedings of Symposium of the Korean Institute of communications and Information Sciences*, 2017 (pp. 563-564).
(Continued)

*Primary Examiner* — Gbemileke J Onamuti
(74) *Attorney, Agent, or Firm* — NSIP Law

(57) ABSTRACT

Provided is a method and apparatus for selective energy transmission in a wireless network. The method for selective energy transmission performed by a terminal in a wireless network includes selecting a transmission request frame for requesting data transmission or a transmission request frame for requesting data transmission and energy reception based on a remaining energy of the terminal; performing a channel contention based on a contention window; receiving a transmission acknowledgement frame by transmitting the selected transmission request frame to a hybrid access point; and transmitting data to the hybrid access point or receiving energy from the hybrid access point according to the transmitted transmission request frame.

18 Claims, 21 Drawing Sheets

(51) Int. Cl.
  *H04W 74/08* (2009.01)
  *H04W 88/10* (2009.01)
  *H04W 52/02* (2009.01)
(52) U.S. Cl.
  CPC ... *H04W 72/0446* (2013.01); *H04W 74/0808* (2013.01); *H04W 88/10* (2013.01)
(58) Field of Classification Search
  USPC .......................................................... 370/329
  See application file for complete search history.

(56) References Cited

U.S. PATENT DOCUMENTS

2016/0360507 A1\* 12/2016 Cariou ...................... H04L 5/00
2018/0014334 A1\* 1/2018 Ahn ...................... H04W 72/04

OTHER PUBLICATIONS

Korea Office Action dated Jan. 20, 2020 for the corresponding Korean Patent Application No. 10-2018-0168677 (5 pages in Korean).
Zhang, Keyi et al., "AP Scheduling Protocol for Power Beacon with Directional Antenna in Energy Harvesting Networks." *In 2017 International Conference on Applied System Innovation (ICASI)*, 2017 (pp. 906-909).
Iqbal, Arshad et al., "Access Mechanism in Wireless Powered Communication Networks With Harvesting Access Point." *IEEE Access*, vol. 6, 2018 (pp. 37556-37567).
Korean Notice of Allowance issued by KIPO dated Jun. 29, 2020 for the corresponding KR Application No. 10-2018-0168677 (5 pages in Korean).

\* cited by examiner

FIG. 8

| Type value | Subtype value | | RTS Type description | Energy Harvesting Type description |
|---|---|---|---|---|
| | RTS Type value | Energy Harvesting Type value | | |
| 11 | 00 | 00 | DRTS | Only data |
| 11 | 10 | 01 | ERTS$_l$ | Long time energy harvesting |
| 11 | 10 | 10 | ERTS$_s$ | Short time energy harvesting |
| 11 | 11 | 11 | Reserved | Reserved |

FIG. 18

| Parameter | Value | Parameter | Value |
|---|---|---|---|
| Payload | 9600 bits | Distant | 4m |
| MAC header | 272 bits | $E_{max}$ | 5000μJ |
| PHY header | 128 bits | $E_{th}$ | 400μJ |
| Data frame | PHY header+ MAC header +Payload | $E_{ERTS\,th}$ | $0 \sim E_{max}$ |
| ACK frame | PHY header+112 bits | Transmission power | 0.020 w |
| RTS frame | PHY header+160 bits | Received power | 0.075 w |
| CTS frame | PHY header+112 bits | Energy supply time by $ERTS_s$ | 5334 μs |
| Data rate | 1 Mbit/s | Energy supply time by $ERTS_l$ | 8000 μs |
| Propagation delay | 15, 31 | $CW_D$ | 15, 31 |
| Slot time | 50μs | $CW_D$ | 63 |
| SIFS | 28μs | Maximum backoff stage (m) | 2, 3 |
| DIFS | 128μs | | |

METHOD AND APPARATUS FOR SELECTIVE ENERGY TRANSMISSION IN WIRELESS NETWORK

CROSS-REFERENCE TO RELATED APPLICATIONS

This application claims priority to Korean Patent Application No. 10-2018-0168677 filed on Dec. 24, 2018 in Korea, the entire contents of which are hereby incorporated by reference in their entirety.

BACKGROUND

1. Technical Field

The present disclosure relates to a method and apparatus for selective energy transmission in a wireless network.

2. Description of Related Art

The characteristics of IEEE 802.11 DCF are described. The Distributed Coordination Function (DCF) based on Carrier Sense Multiple Access with Collision Avoidance (CSMA/CA) is a Medium Access Control (MAC) protocol used for preventing collision when terminals access a channel in a wireless network environment.

In the channel contention using the DCF, first, all terminals check whether a channel is in an idle state during DCF Interframe Space (DIFS) time, and when the channel is in the idle station, perform a random backoff contention for using the channel. The terminals select a random backoff value in a contention window value and wait by decreasing the value according to a time. The terminals of which backoff value reaches 0 perform a data transmission request by transmitting Request to Send (RTS) to an Access Point (AP). In the case that a single terminal transmits the RTS, the AP receives the RTS and inform that data transmission is available by transmitting a Clear to Send (CTS) in response to it. The terminal that receives the CTS corresponding to the transmitted RTS transmits data to the AP. The AP that receives the data transmit an Acknowledge (ACK) to the terminal and informs that data transmission is completed. In the case that two or more terminals transmit the RTS, the AP fails to receive the RTS owing to collision and does not transmit the CTS. The terminal that fails to receive the CTS increases a contention window value CW twice and receive a new random backoff value in the corresponding range, and then, transmits data again.

FIG. 1 is a diagram for describing an operation example of a channel contention protocol in a wireless network environment.

FIG. 1 shows a channel contention protocol operation example using the DCF based on the CSMA/CA in a wireless network environment including an Access Point (AP) and three devices (Device 1, Device 2 and Device 3). All terminals check whether a channel is in an idle state during the Distributed Inter Frame Space (DIFS) period and perform backoff contentions based on designated contention window values. At this time, the terminal (Device 1) that succeeds in the contention transmit an RTS to the AP. The AP that receives the RTS responds by transmitting a CTS to Device 1. Device 1 transmits data and receives ACK from the AP, and accordingly, informs that data is successfully transferred. For Device 2, when transmitting an RTS to the AP after succeeding the backoff contention, the RTS collides with an RTS of Device 3 that succeeds in the backoff contention. Device 2 and Device 3 of which RTSs collide fail to receive a CTS from the AP and perform a channel contention again with other terminals with the random backoff value which is obtained by increasing a size of contention window double to a maximum. In this case, the collided terminals count a retry count, which is retransmission count whenever a collision occurs and restrict a retry limit, which is a maximum retransmission count, and accordingly, retransmission is performed. If the retry count exceeds the retry limit, the terminals discard the data and transmit an RTS for the next data transmission.

Meanwhile, the problem occurred when an energy harvesting technique is applied to the DCF channel contention is described. The terminals included in a wireless network have a limited energy storage device such as a battery and have a limitation in operation time. To solve the problem of supplying power to a battery of a terminal, the energy harvesting technique is widely used.

In a wireless network environment including a Hybrid Access Point (H-AP) having a Power Beacon (PB) function and terminals, both data transmission and energy reception may be performed in the DCF channel allocation of a single time. However, a legacy RTS/CTS is hard to perform the operation mentioned above considering a data transmission only.

SUMMARY

Exemplary embodiments of the present disclosure is to provide a method and apparatus for selective energy transmission in a wireless network in which terminals use different types of RTSs used for performing a selective energy request with a hybrid access point (H-AP) in a wireless network environment including the hybrid access point which can transmit energy, and accordingly, the terminal may sequentially perform energy reception from the H-AP and data transmission to the H-AP.

In addition, exemplary embodiments of the present disclosure is also to provide a method and apparatus for selective energy transmission in a wireless network in which a terminal can select whether an RTS for data transmission only is used or an RTS for energy reception and data transmission sequentially is used based on a probability determined according to remaining energy amount of the terminal for an efficient channel use and select an RTS type for energy reception according to each energy reception RTS selection probability.

In addition, exemplary embodiments of the present disclosure is also to provide a method and apparatus for selective energy transmission in a wireless network which can guarantee a data throughput that does not influence on data transmission of terminals in the least by using different contention window values according to whether a sequential energy reception.

According to one example embodiment of the present disclosure, it is provided a method for selective energy transmission performed by a terminal in a wireless network including selecting a transmission request frame for requesting data transmission or a transmission request frame for requesting data transmission and energy reception based on a remaining energy of the terminal; performing a channel contention based on a contention window; receiving a transmission acknowledgement frame by transmitting the selected transmission request frame to a hybrid access point; and transmitting data to the hybrid access point or receiving energy from the hybrid access point according to the transmitted transmission request frame.

The step of selecting a transmission request frame may include: calculating an energy request probability based on the remaining energy of the terminal; and selecting the transmission request frame for requesting data transmission or the transmission request frame for requesting data transmission and energy reception based on the calculated energy request probability.

The step of calculate an energy request probability may include: calculating an energy request probability using a maximum energy amount, a preconfigured energy threshold value and the remaining energy amount of the terminal.

The step of calculate an energy request probability may include: calculating an energy request probability in the remaining energy amount of a preconfigured energy threshold value or more to be linearly proportional to the remaining energy amount.

The step of selecting a transmission request frame may include: calculating an energy reception amount selection probability for selecting an energy reception amount; and selecting a transmission request frame having any one energy reception amount among at least one energy reception amount based on the calculated energy reception amount selection probability.

The step of performing a channel contention may include: selecting a contention window value according to the selected transmission request frame.

The step of performing a channel contention may include: selecting a contention window value according to a transmission request frame for requesting data transmission and a contention window value according to a transmission request frame for requesting energy reception differently.

The step of performing a channel contention may include: selecting a contention window value according to the selected transmission request frame having the selected any one energy reception amount.

According to another example embodiment of the present disclosure, it is provided a method for selective energy transmission performed by a hybrid access point in a wireless network including receiving a transmission request frame for requesting data transmission or a transmission request frame for requesting data transmission and energy reception from a terminal; selecting a transmission acknowledgement frame according to the received transmission request frame and transmitting it to the terminal; and receiving data from the terminal or transmitting energy to the terminal according to the received transmission request frame.

The step of selecting a transmission acknowledgement frame and transmitting it to the terminal may include: selecting a transmission acknowledgement frame for identifying a data transmission request or a transmission acknowledgement frame for identifying a data transmission request and an energy reception request according to the received transmission request frame and transmitting it to the terminal.

The step of receiving the transmission request frame may include: receiving a transmission request frame having any one energy reception amount among at least one energy reception amount.

The step of selecting a transmission acknowledgement frame and transmitting it to the terminal may include: selecting a transmission acknowledgement frame for identifying any one energy reception amount which is received and transmit it to the terminal.

According to another example embodiment of the present disclosure, it is provided a terminal in a wireless network including a communication module for transmitting data or receiving energy; and a processor for controlling an operation of the communication module, wherein the processor is configured to: select a transmission request frame for requesting data transmission or a transmission request frame for requesting data transmission and energy reception based on a remaining energy of the terminal; perform a channel contention based on a contention window; receive a transmission acknowledgement frame by transmitting the selected transmission request frame to a hybrid access point; and transmit data to the hybrid access point or receive energy from the hybrid access point according to the transmitted transmission request frame.

The processor may calculate an energy request probability based on the remaining energy of the terminal and selects the transmission request frame for requesting data transmission or the transmission request frame for requesting data transmission and energy reception based on the calculated energy request probability through the communication module.

The processor may calculate an energy request probability using a maximum energy amount, a preconfigured energy threshold value and the remaining energy amount of the terminal.

The processor may calculate an energy request probability in the remaining energy amount of a preconfigured energy threshold value or more to be linearly proportional to the remaining energy amount.

The processor may calculate an energy reception amount selection probability for selecting an energy reception amount and select a transmission request frame having any one energy reception amount among at least one energy reception amount based on the calculated energy reception amount selection probability.

The processor may select a contention window value according to the selected transmission request frame.

The processor may select a contention window value according to a transmission request frame for requesting data transmission and a contention window value according to a transmission request frame for requesting energy reception differently.

The processor may select a contention window value according to the selected transmission request frame having the selected any one energy reception amount.

Meanwhile, according to another example embodiment of the present disclosure, it is provided a hybrid access point in a wireless network including a communication module for receiving data or transmitting energy; and a processor for controlling an operation of the communication module, wherein the processor is configured to: receive a transmission request frame for requesting data transmission or a transmission request frame for requesting data transmission and energy reception from a terminal; select a transmission acknowledgement frame according to the received transmission request frame and transmit it to the terminal; and receive data from the terminal or transmit energy to the terminal according to the received transmission request frame.

The processor may select a transmission acknowledgement frame for identifying a data transmission request or a transmission acknowledgement frame for identifying a data transmission request and an energy reception request according to the received transmission request frame and transmits it to the terminal through the communication module.

The processor may receive a transmission request frame having any one energy reception amount among at least one energy reception amount.

The processor may select a transmission acknowledgement frame for identifying any one energy reception amount which is received and transmit it to the terminal.

According to exemplary embodiments of the present disclosure, an efficiency of channel use can increase by performing energy reception and data transmission when a terminal requires energy reception.

According to exemplary embodiments of the present disclosure, in a wireless network environment including a hybrid access point (H-AP) available to transmit energy, terminals use different types of RTSs used for performing a selective energy request to the hybrid access point, and accordingly, the terminal may perform energy reception from the H-AP and data transmission to the H-AP sequentially.

In addition, according to exemplary embodiments of the present disclosure, it may be selected whether a terminal uses an RTS only for data transmission based on the probability determined according to the remaining energy amount of the terminal or uses an RTS for sequential energy reception and data transmission for an efficient channel use, and select an RTS type for receiving energy according to each energy reception RTS selection probability.

In addition, according to exemplary embodiments of the present disclosure, different contention window values are used according to whether to receive energy sequentially, and accordingly, data throughput is guaranteed, which does not influence on data transmission of terminals in the least.

BRIEF DESCRIPTION OF THE DRAWINGS

FIG. 8 is a diagram for describing RTS/CTS type and Energy Harvesting Type value of the RTS/CTS frame format used in an embodiment of the present disclosure.

FIG. 18 is a diagram for describing parameters used in an experiment for comparing transmission data rate in comparison with provided energy between the embodiments of the present disclosure and the comparison method.

DETAILED DESCRIPTION

Figure 1:
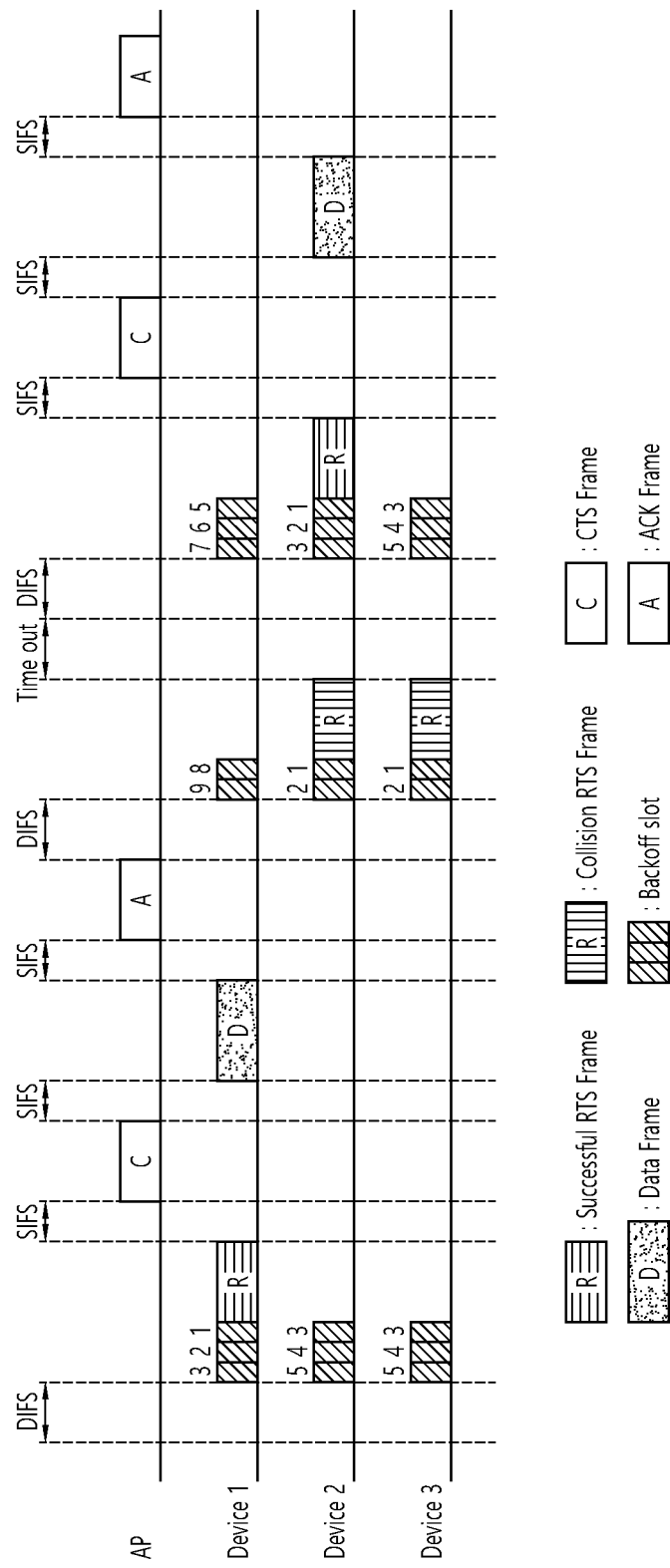
FIG. 1 is a diagram for describing an operation example of a channel contention protocol in a wireless network environment.

The present disclosure may have various modifications and various embodiments and specific embodiments will be illustrated in the drawings and described in detail in the detailed description.

However, this does not limit the present disclosure to specific embodiments, and it is understood that the present disclosure covers all the modifications, equivalents and replacements included within the idea and technical scope of the present disclosure.

Terms including as first, second, and the like are used for describing various constituent elements, but the constituent elements are not limited by the terms. The terms are used only to discriminate one constituent element from another component. For example, a first component may be referred to as a second component, and similarly, the second component may be referred to as the first component without departing from the scope of the present disclosure. A term 'and/or' includes a combination of a plurality of associated disclosed items or any item of the plurality of associated disclosed items.

When it is described that a component is "connected to" or "accesses" another component, the component may be directly connected to or access the other component, or a third component may be present there between. In contrast, it is understood that, when it is described that an element is "directly connected to" or "directly access" another element, it is understood that no element is present between the element and another element.

Terms used in the present application are used only to describe specific embodiments and are not intended to limit the present disclosure. A singular form may include a plural form if there is no clearly opposite meaning in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

Unless it is contrarily defined, all terms used herein including technological or scientific terms have the same meanings as those generally understood by a person with ordinary skill in the art. Terms which are defined in a generally used dictionary should be interpreted to have the same meaning as the meaning in the context of the related art and are not interpreted as an ideal meaning or excessively formal meanings unless clearly defined in the present application.

Hereinafter, preferred embodiments of the present disclosure will be described in detail with reference to the accompanying drawings and in describing the preferred embodiments with reference to the accompanying drawings, the same reference numeral will refer to the same or corresponding component regardless of the reference numeral and a duplicated description thereof will be omitted.

Figure 2:
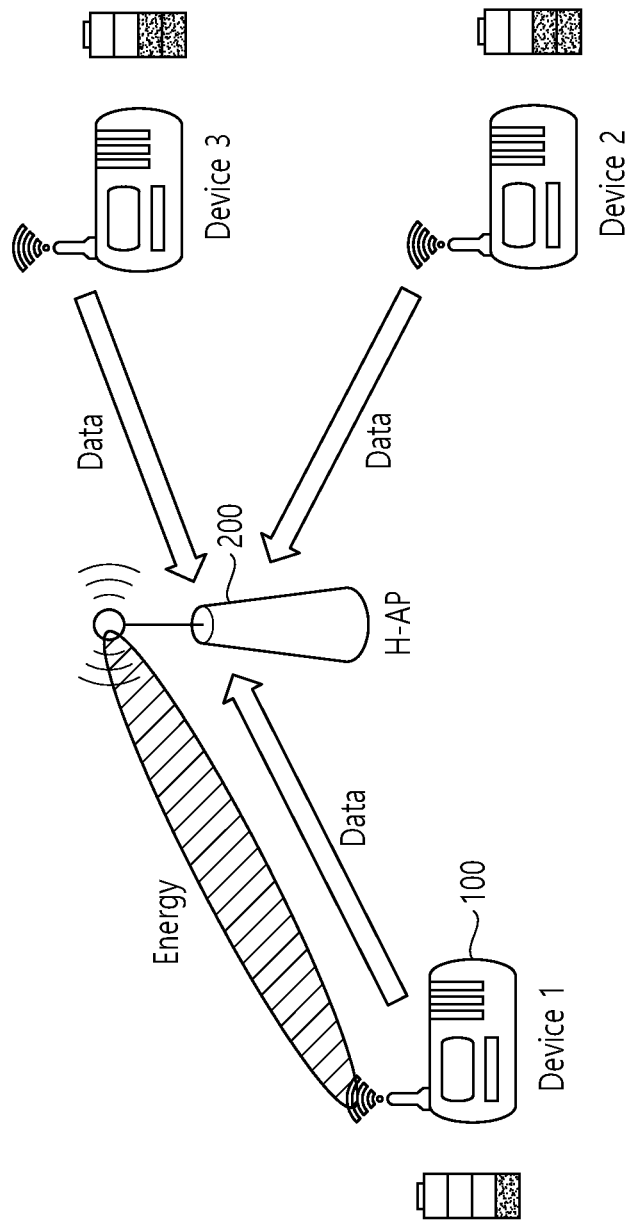
FIG. 2 is a diagram for describing a wireless network environment to which a selective energy transmission method according to an embodiment of the present disclosure is applied.

FIG. 2 is a diagram for describing a wireless network environment to which a selective energy transmission method according to an embodiment of the present disclosure is applied.

FIG. 2 shows a wireless network environment including a Hybrid Access Point (H-AP) 200 having a Power Beacon function that performs energy transmission and terminals 100.

As shown in FIG. 2, the selective energy transmission method according to an embodiment of the present disclosure may be applied to a Wireless Local Area Network (WLAN) environment including a Hybrid-Access Point (H-AP) 200 for receiving data and terminals 100 in which energy is provided to the terminals 100. In the wireless network environment, the terminal 100 may perform a selective Energy Harvesting and data transmission using different types of RTSs according to an energy state.

More particularly, the terminal 100 determines an energy request probability based on its own remaining energy amount and determines whether to use Data Request to Send (DRTS) for transmitting data only based on the energy request probability or Energy Request to Send (ERTS) for receiving data and energy sequentially. Further, in the case that the terminal 100 determines the data and energy reception, the terminal 100 determines ERTS$_s$ or ERTS$_l$ of which energy reception amount is different according to each energy reception RTS selection probability. In addition, the terminal 100 may perform a channel contention using different size of contention windows according to whether to transmit data only or sequentially perform energy reception not only the data transmission.

As such, in the wireless network environment including the H-AP 200 having the function of Power Beacon (PB) and the terminals 100, the terminals 100 may perform both data transmission and energy reception only with a single DCF channel allocation.

Figure 3:
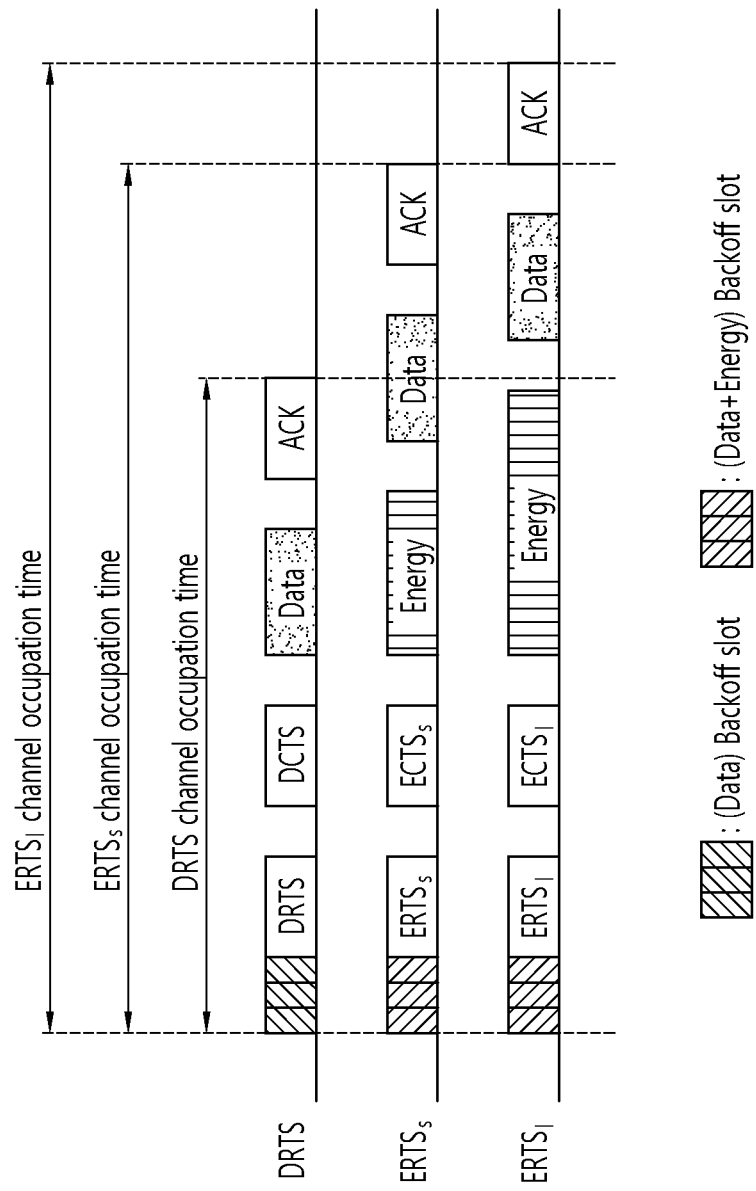
FIG. 3 is a diagram for describing an operation according to each RTS and a channel occupation time used in an embodiment of the present disclosure.

FIG. 3 is a diagram for describing an operation according to each RTS and a channel occupation time used in an embodiment of the present disclosure.

As shown in FIG. 3, an embodiment of the present disclosure describes the operation of the terminal 100 and the H-AP 200 for selective energy harvesting of the terminal 100 utilizing three types of RTSs of which channel occupation times are different in the network environment including the H-AP 200 and the terminals 100.

The three types of RTSs may include a DRTS for requesting data transmission, ERTS$_s$ for requesting data transmission and energy reception less than a preconfigured reception amount and ERTS$_l$ for requesting data transmission and energy reception more than a preconfigured reception amount. The channel occupation time is changed according to the three types of RTSs. The channel occupation time increases in the order of DRTS, ERTS$_s$ and ERTS$_l$.

The contention window may be classified into a Data Backoff slot for data transmission and a Data+Energy Backoff slot for data transmission and energy reception.

Figure 4:
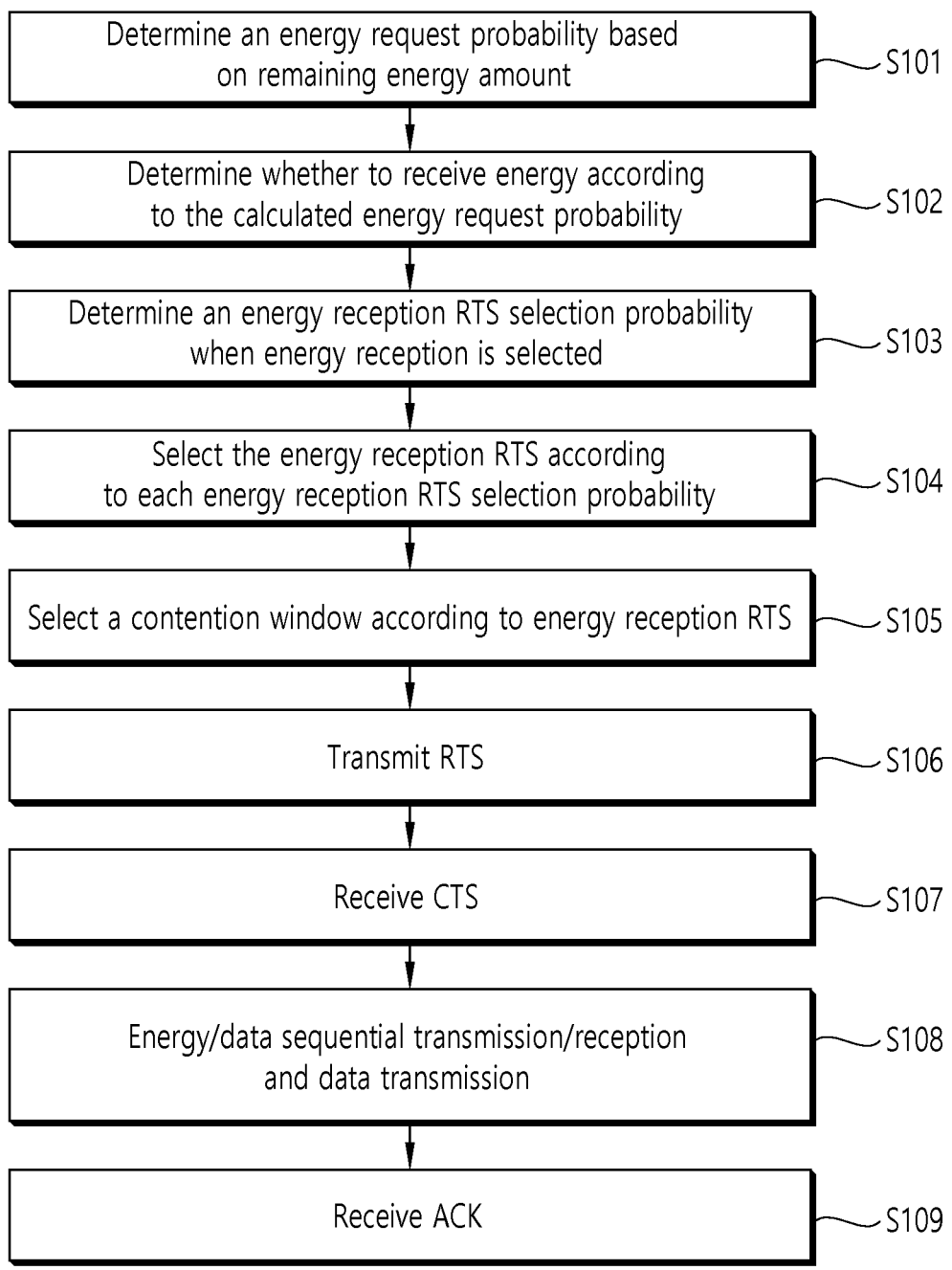
FIG. 4 is diagram for describing a selective energy reception method of a terminal in a wireless network according to an embodiment of the present disclosure.

FIG. 4 is diagram for describing a selective energy reception method of a terminal in a wireless network according to an embodiment of the present disclosure.

As shown in FIG. 4, the terminal 100 of a wireless network according to an embodiment of the present disclosure may receive energy selectively using three types of RTSs according to the remaining energy state.

For this, in step S101, the terminal 100 determines an energy request probability by calculating the energy request probability based on its own remaining energy amount.

In step S102, the terminal 100 determines whether to receive energy that determines to receive energy according to the calculated energy request probability.

In step S103, in the case that a sequential energy reception is selected, to determine an RTS type used for energy reception, the terminal 100 determines an energy reception RTS selection probability for calculating each energy reception RTS selection probability.

In step S104, in the case that an energy reception is selected, the terminal 100 selects the energy reception RTS for selecting ERTS$_s$ or ERTS$_l$ of which energy reception amount is different according to each energy reception RTS selection probability.

In step S105, the terminal 100 selects a contention window value which is going to be used in backoff contention according to whether to receive the determined energy.

In step S106, the terminal 100 selects a backoff value in the selected contention window value and transmit the RTS selected through the contention to the H-AP 200.

In step S107, the terminal 100 receives a CTS from the H-AP 200.

Later, in step S108, the terminal 100 performs an energy/data sequential transmission/reception step for receiving energy from the H-AP 200 and transmitting data sequentially or a data transmission step for transmitting data according to the transmitted RTS.

In step S109, the terminal 100 processes ACK reception step for informing that the transmitted data is received in the H-AP 200.

Hereinafter, with reference to FIG. 4 to FIG. 9, the operation of the terminal 100 is described.

In the energy request probability determination step (step S101), the terminal 100 calculates the energy request probability based on the remaining energy amount. When the maximum energy amount of the terminal 100 is $E_{max}$, the energy threshold value is $E_{th}$, and the remaining energy amount is $E_{res}$, the energy request probability $p_E$ for using the RTS type for transmit data and receive energy sequentially is as represented in Equation 1.

$$p_E = \min\left(\frac{E_{max} - E_{res}}{E_{max} - E_{th}}, 1\right), \qquad \text{[Equation 1]}$$

$$0 \leq E_{res} \leq E_{max}$$

That is, as the remaining energy amount of the terminal 100 is smaller, the energy request probability $p_E$ to the H-AP 200 increases, and the probability of selecting ERTS increases.

Figure 5:
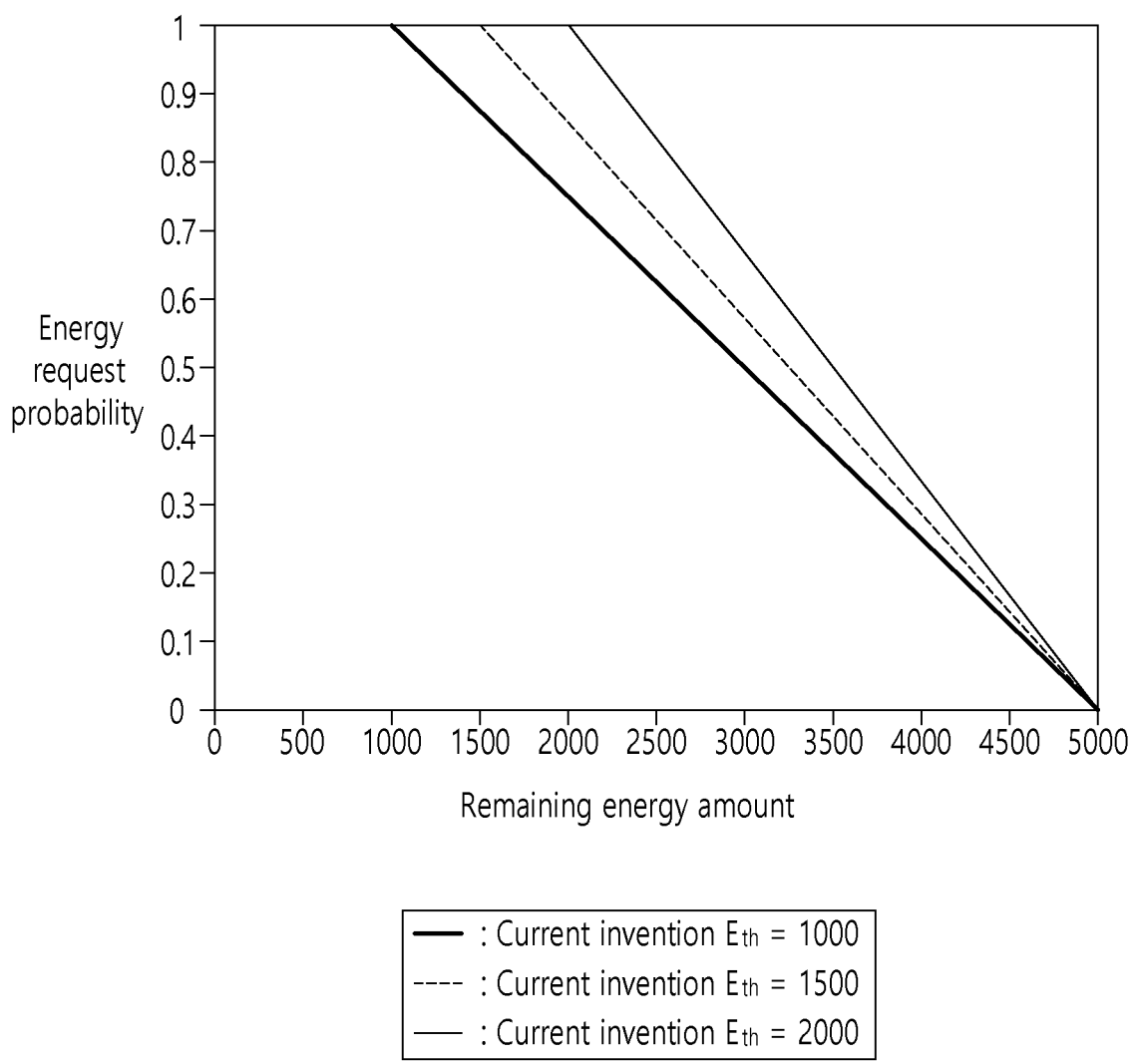
FIG. 5 is a diagram for describing a graph illustrating an energy request probability according to a remaining energy amount when energy threshold values are differently set used in an embodiment of the present disclosure.

FIG. 5 is a diagram for describing a graph illustrating an energy request probability according to a remaining energy amount when energy threshold values are differently set used in an embodiment of the present disclosure.

In the case that the maximum energy amount of battery is set to 5000 µJ and $E_{th}$ are differently set in Equation 1 used in an embodiment of the present disclosure, the graph showing the energy request probability according to a remaining energy amount is shown in FIG. 5. FIG. 5 shows a value of the energy request probability according to a remaining energy amount in the case that the maximum energy amount and the energy threshold value are set to specific values in Equation 1. FIG. 5 shows that the energy request is performed always in the remaining energy amount of the energy threshold value or less, and the energy request probability in the remaining energy amount of the energy threshold value or more decreases linearly in proportional to the remaining energy amount. Through this, the terminal of which remaining energy amount is small set the energy request probability high, and accordingly, the terminals 100 in which energy reception is imperatively necessary may perform energy request preferentially. Through this, the channel occupation time for energy transmission may be minimized.

Meanwhile, the energy reception determination step (step S102) is described in detail. In an embodiment of the present disclosure, the selective energy harvesting of the terminal 100, three types of RTSs of which channel occupation times are different are used.

Figure 6:
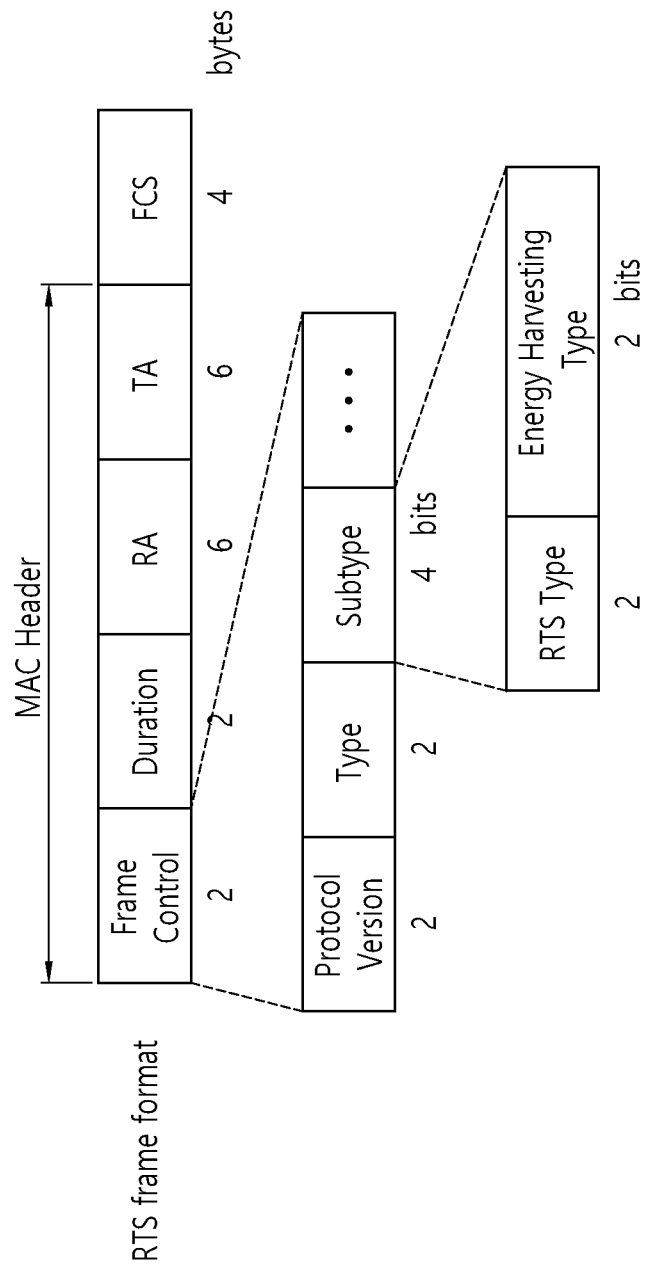
FIGS. 6 and 7 are diagrams for describing RTS and CTS frame formats used in an embodiment of the present disclosure.
Figure 7:
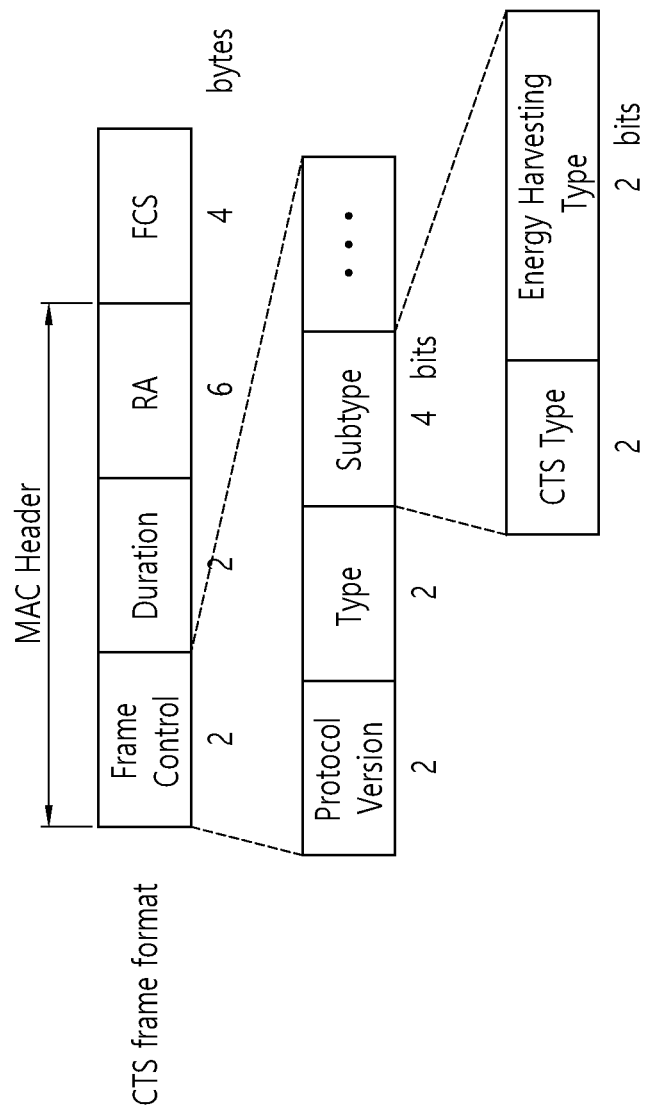

FIGS. 6 and 7 are diagrams for describing RTS and CTS frame formats used in an embodiment of the present disclosure.

The RTS/CTS frame format used in the present disclosure is as shown in FIG. 6 and FIG. 7. The RTS frame format includes a Frame Control field. The Frame Control field includes a Protocol version field, a Type field and a Subtype field. The Subtype field includes an RTS type filed and an Energy Harvesting Type field. The Frame Control field includes a Protocol version field, a Type field and a Subtype field. The Subtype field includes a CTS type filed and an Energy Harvesting Type field.

FIG. 8 is a diagram for describing RTS/CTS type and Energy Harvesting Type value of the RTS/CTS frame format used in an embodiment of the present disclosure.

Figure 10:
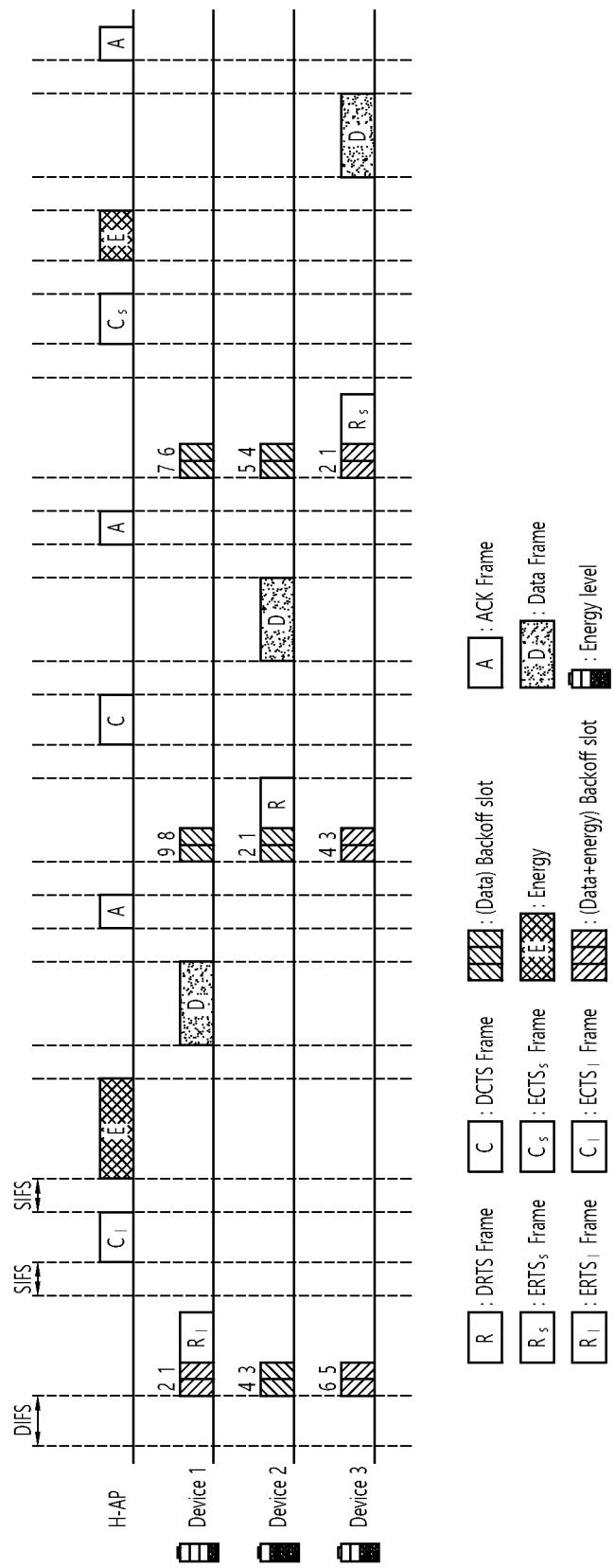
FIG. 10 is a diagram for describing an operation example of energy/data transmission/reception procedure utilizing a hetero-RTS according to an embodiment of the present disclosure.
Figure 11:
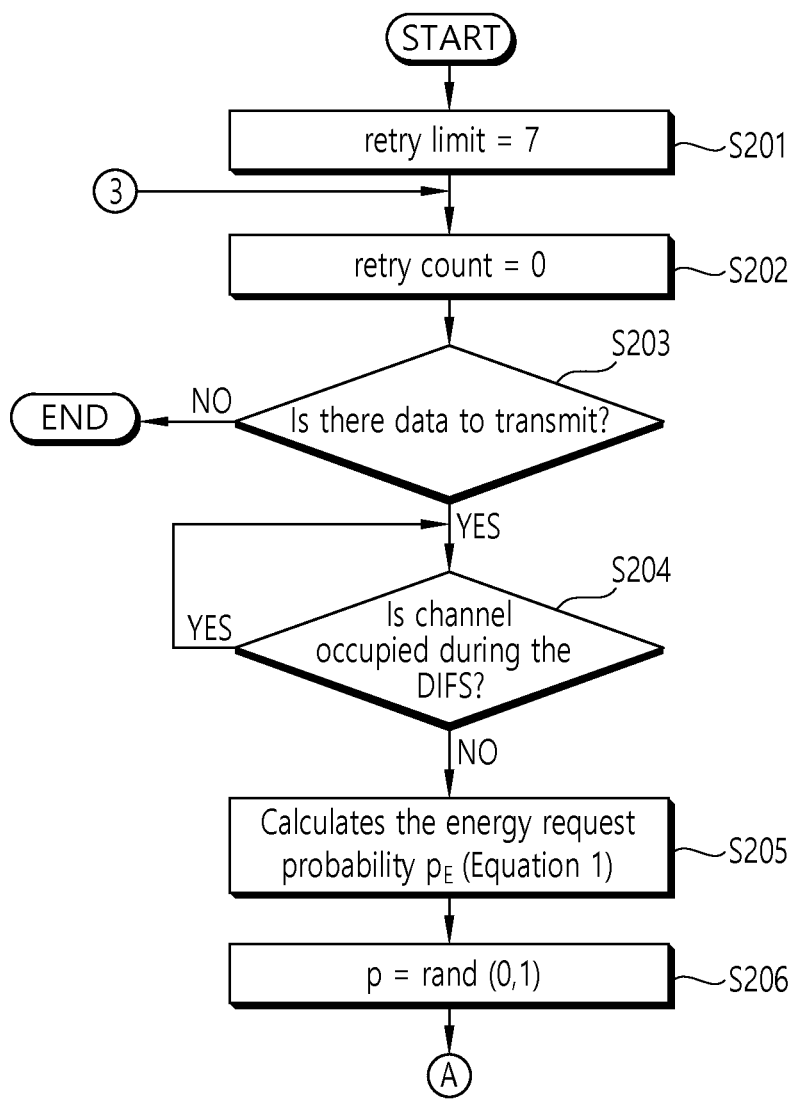
FIGS. 11 to 15 are diagrams for describing an operation procedure of a terminal utilizing a hetero-RTS according to an embodiment of the present disclosure.
Figure 12:
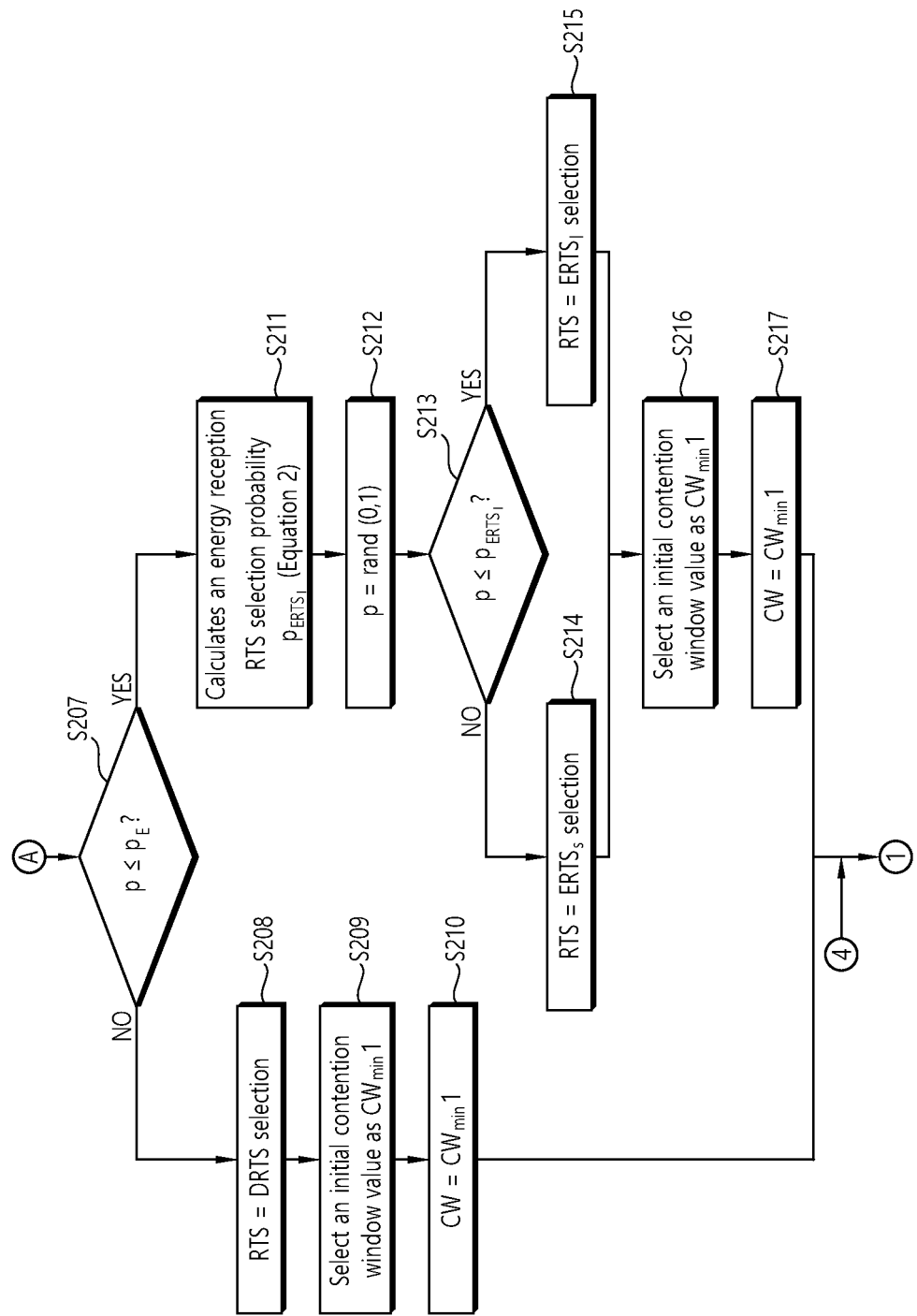
Figure 13:
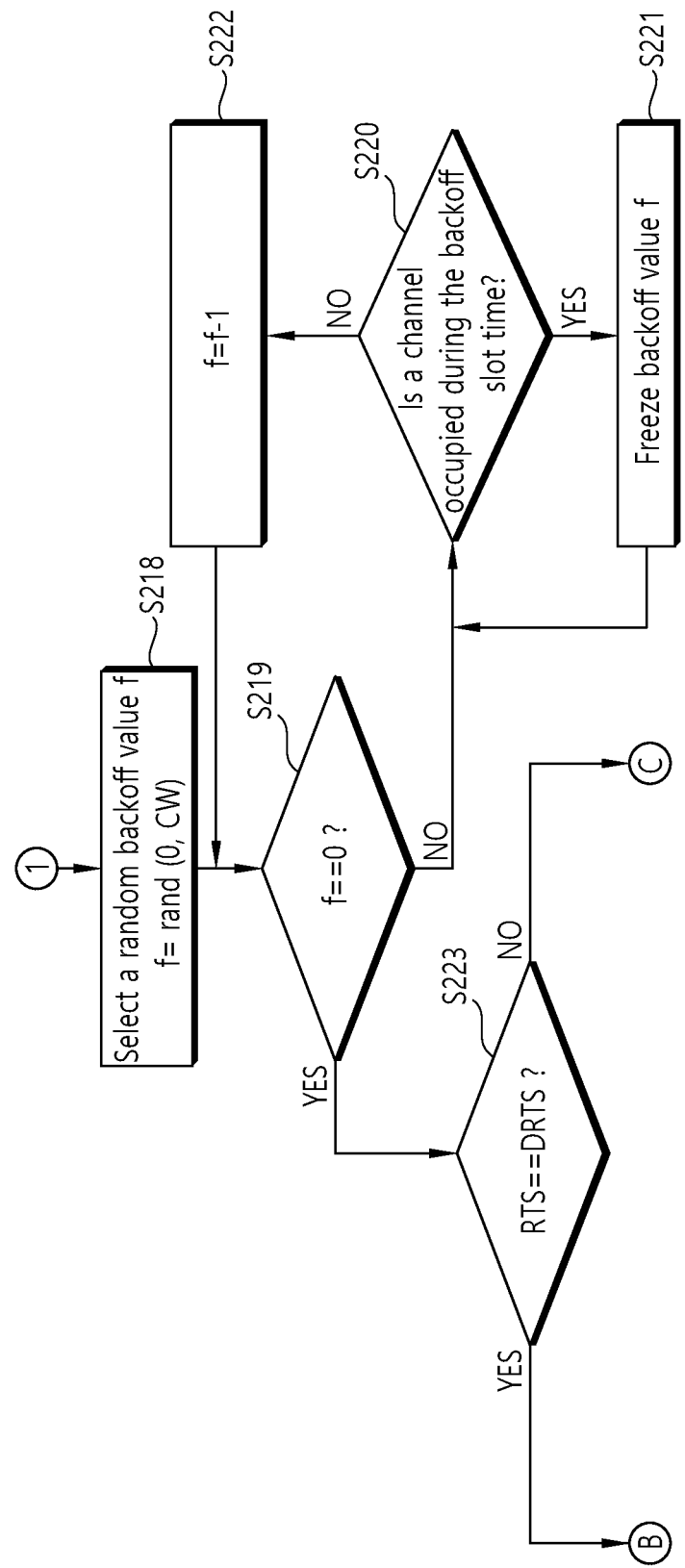
Figure 14:
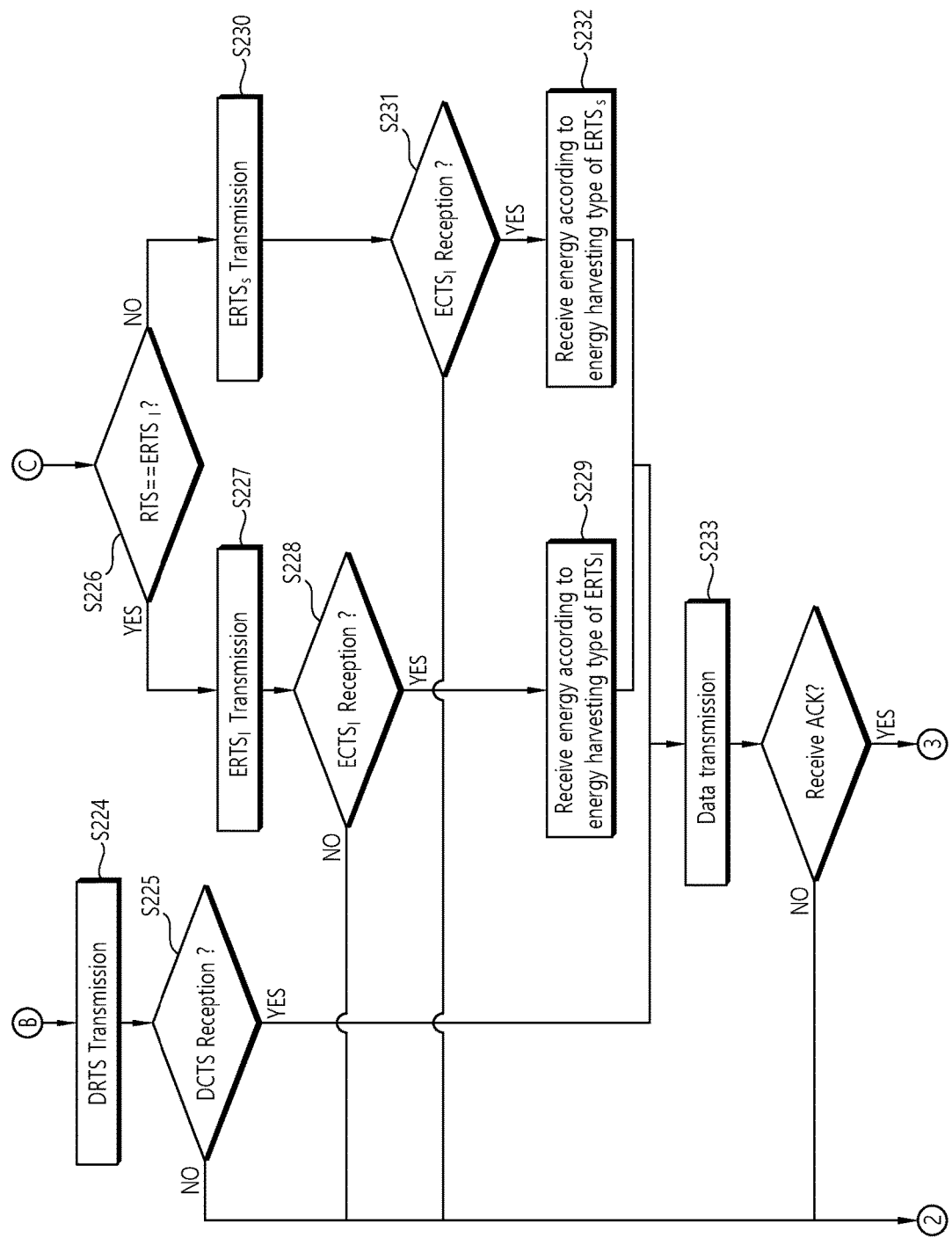
Figure 15:
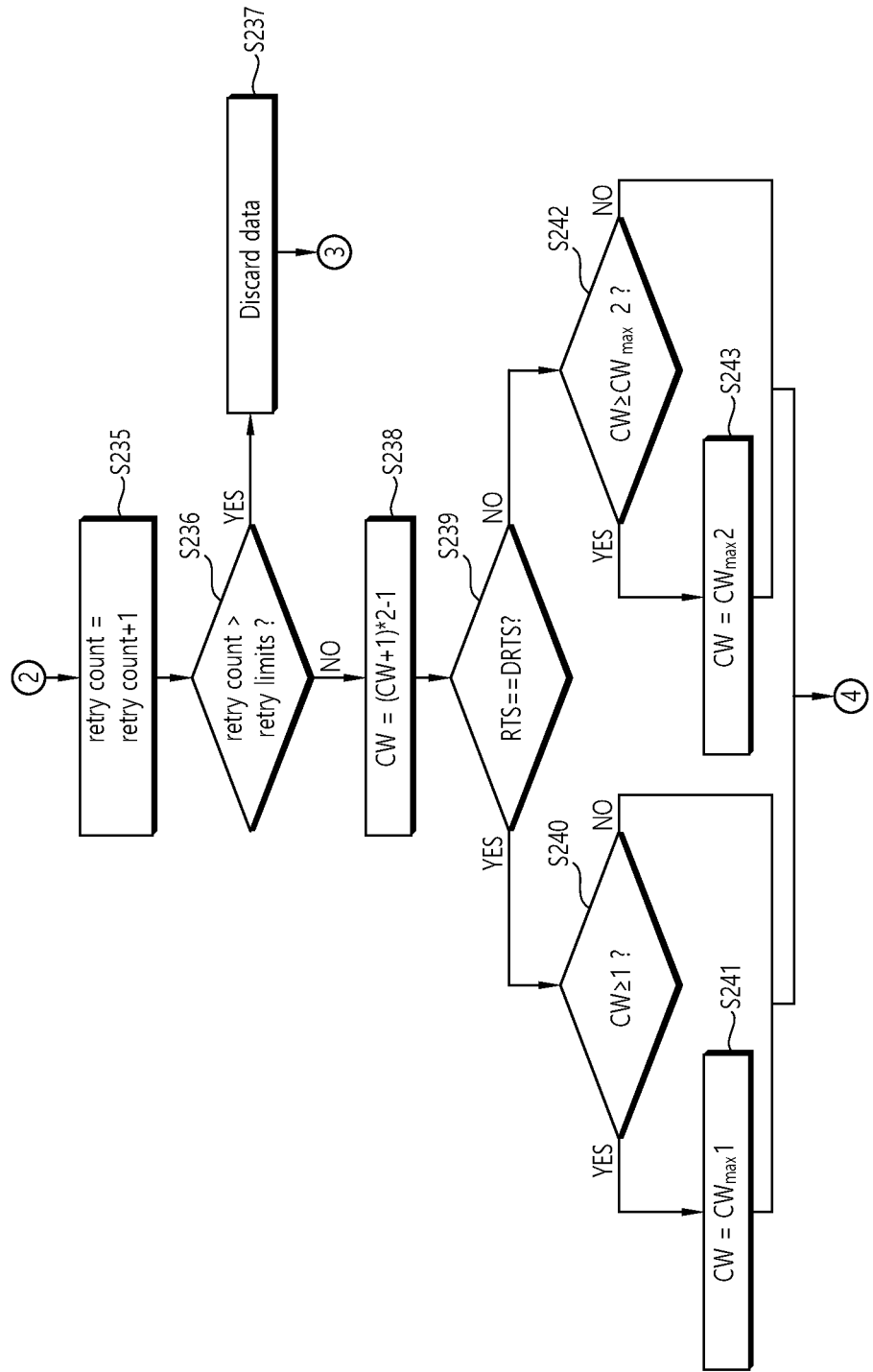

As represented in Table 1 of FIG. 8, when a bit value of the Type field in the Frame Control field is 11, the terminal 100 determines the RTS/CTS type and the Energy Harvesting Type by using the Subtype field as the RTS/CTS type and the Energy Harvesting Type fields. At this time, it is used the DRTS in which the terminal 100 transmits data only to the H-AP 200 and the ERTS in which data transmission and energy reception are sequentially requested. In the case that the DRTS is used, the operation is the same as the legacy DCF operation, and in the case that the ERTS is used, the energy reception and the data transmission are sequentially performed after the terminal 100 transmits the ERTS to the H-AP 200, and then receives the ECTS from the H-AP 200 as shown in FIG. 10.

In the energy reception determination step (step S102), based on the energy request probability $p_E$ calculated for a selective energy reception of the terminal 100, the terminal determines whether to perform data transmission only or to perform data transmission and energy reception sequentially. When the energy request probability $p_E$ is determined in the energy request probability determination step, the probability of using the DRTS is determined to be $1-p_E$, and the probability of using the ERTS is determined to be $p_E$ based on the obtained $p_E$. According to the probability, the terminal 100 selects the DRTS or the ERTS.

Meanwhile, the energy reception RTS selection probability determination step (step S103) is described in detail.

In the energy reception RTS selection probability determination step, in the case that the terminal 100 selects to use the ERTS, to select $ERTS_s$ and $ERTS_l$ having different energy reception amounts, each energy reception RTS selection probability is calculated based on the remaining energy of the terminal 100. The probability $p_{ERTS_s}$ of selecting $ERTS_s$ and the probability $p_{ERTS_l}$ of selecting $ERTS_l$ are as represented in Equation 2.

$$p_{ERTS_l} = \frac{1}{1+e^{0.005(E_{res}-E_{ERTS_{th}})}}, \quad [\text{Equation 2}]$$

$$0 \le E_{res} \le E_{max}$$

$$p_{ERTS_s} = 1 - p_{ERTS_l},$$

$$0 \le p_{ERTS_l} \le 1$$

$E_{ERTS_k}$ represents an energy amount at which $p_{ERTS_p}$ becomes greater than $p_{ERTS_l}$, and at this time, $ERTS_l$ has more amount of reception energy than the case of using $ERTS_s$.

Figure 9:
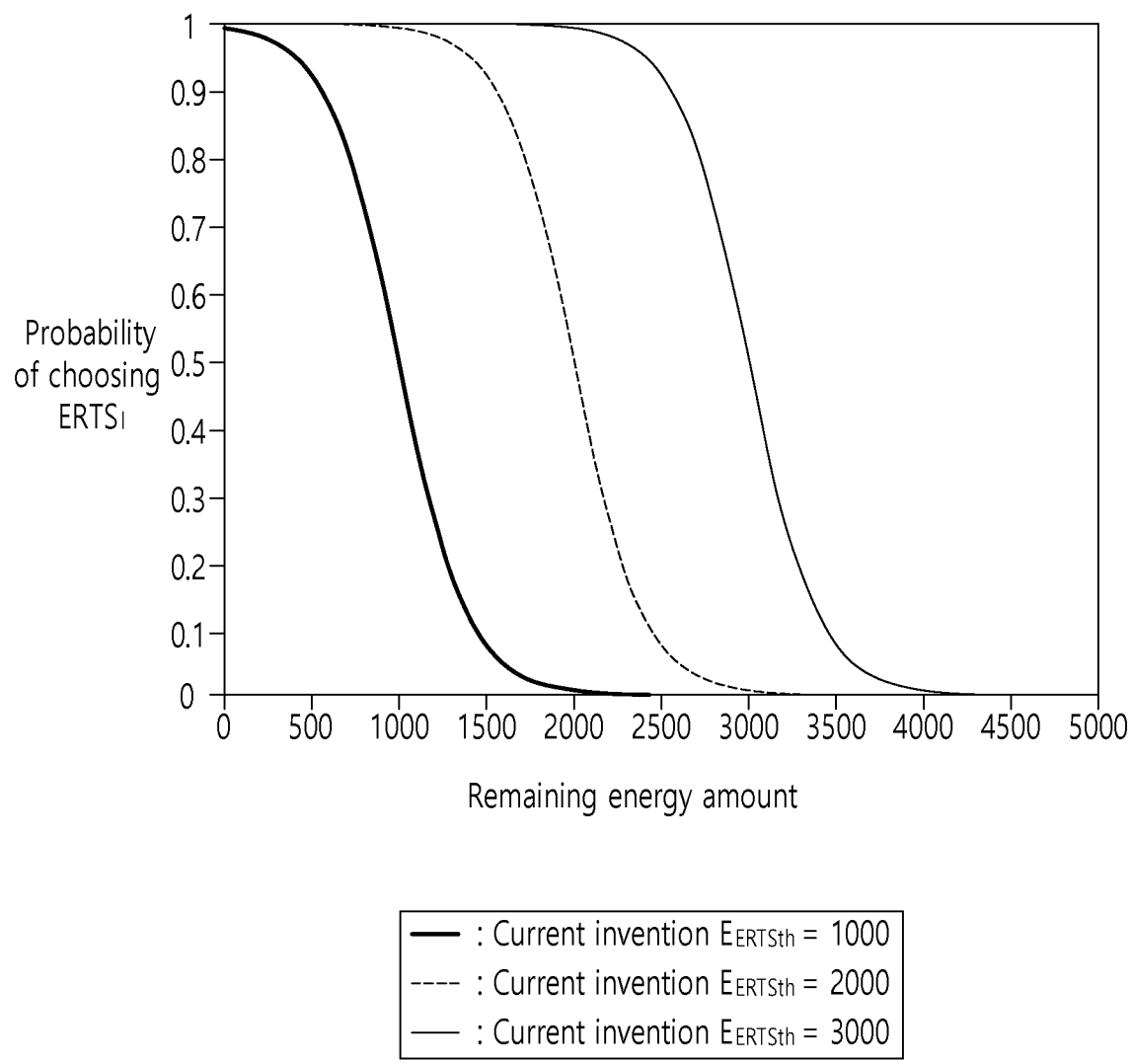
FIG. 9 is a diagram for describing $ERTS_j$ selection probability value according to the remaining energy amount when the maximum energy amount and $E_{ERTS_k}$ are set to specific values used in an embodiment of the present disclosure.

FIG. 9 is a diagram for describing $ERTS_l$ selection probability value according to the remaining energy amount when the maximum energy amount and $E_{ERTS_k}$ are set to specific values used in an embodiment of the present disclosure.

In the case that the maximum energy amount of battery is set to 5000 μJ and $E_{ERTS_k}$ are differently set in Equation 2 used in an embodiment of the present disclosure, the probability of selecting $ERTS_l$ according to a remaining energy amount is shown in FIG. 9. FIG. 9 shows that $ERTS_l$ selection probability increases with a curve as the remaining energy amount decreases. Through this, since the terminal requires more reception energy amount as the remaining energy amount decreases, the probability $p_{ERTS_l}$ of selecting $ERTS_l$ is greater than the probability $p_{ERTS_s}$ of selecting $ERTS_s$.

Meanwhile, the energy reception RTS selection step (step S104) is described in detail.

According to an embodiment of the present disclosure, as shown in FIG. 3, for the energy harvesting of the terminal 100, two types of ERTSs of which reception energy amount is different may be used. In the energy reception RTS selection step, to receive energy of different amount according to the remaining energy, it is selected $ERTS_s$ of requesting energy reception less than a preconfigured reception amount used for the energy reception or $ERTS_l$ of requesting data transmission and energy reception greater than a preconfigured reception amount, which is determined according to the RTS selection probability obtained in the energy reception RTS selection probability determination step. The terminal 100 of which remaining energy amount is small selects $ERTS_l$ more than $ERTS_s$ since the terminal 100 obtains $p_{ERTS_l}$ in higher value than $p_{ERTS_s}$. At this time, a value of energy harvesting type field value is selected according to the determined ERTS, and a channel use time in which the channel use time used for receiving the energy determined according to the energy harvesting type field from the H-AP 200 is added in the Duration field of the RTS and transmitted to the H-AP 200.

Hereinafter, the contention window selection step (step S105) is described in detail.

As shown in FIG. 3, in the case that the ERTS is used, an energy reception is performed at the same time, and the ERTS has longer channel occupation time than in the case of using the DRTS. Accordingly, in an embodiment of the present disclosure, different contention window values are used according to the RTS type.

In the contention window selection step, a contention window value is selected, which is to be used according to the RTS type selected through the previous procedure. The contention window value CW1 used in the DRTS and the contention window value CW2 used in the ERTS are as represented in Equation 3. Here, the contention window values are not limited to CW1 and CW2, but different contention window values may be used in each RTS, that is, DRTS, ERTS$_s$, and ERTS$_l$.

$$\begin{cases} CW1 = 2^a - 1 & (3 \leq a < 7) \\ CW2 = 2^b - 1 & (a < b \leq 8) \end{cases} \quad \text{[Equation 3]}$$

Herein, a is an integer of 3 or more and less than 7, and b is greater than a and 8 or less, which are exemplary values and not limited to specific values. In addition, the minimum values $CW_{min}1$ and $CW_{min}2$ of CW1 and CW2 are used initial contention window values, respectively, and the maximum values $CW_{max}1$ and $CW_{max}2$ are used the maximum contention window values, which are limited values of the contention window value that may be increased by the collided terminal 100. As such, different contention window values are used according to the RTS type, the energy supply may not influence on the data transmission of the terminals 100 in the least, and accordingly, data throughput may be guaranteed.

Meanwhile, the RTS transmission step (step S106) is described in detail.

In the RTS transmission step, a backoff contention is performed based on the contention window value determined according to the RTS type and the selected RTS is transmitted to the H-AP 200.

Hereinafter, the CTS reception step (step S107) is described in detail.

In the CTS reception step, when the terminal that succeeds through the backoff contention transmits the RTS to the H-AP 200 successfully, the terminal 100 receives the CTS from the H-AP 200. By receiving the CTS, the terminal 100 becomes available to perform sequential energy/data transmission/reception with the H-AP 200 and data transmission. In addition, when the terminal 100 transmits a DRTS to the H-AP 200, the terminal 100 receives the DCTS from the H-AP 200, and when the terminal 100 transmits ERTS$_s$ or ERTS$_l$, the terminal 100 receives ECTS$_s$ or ECTS$_l$, respectively.

In the case that the terminal 100 that transmits the RTS fails to receive the CTS, the terminal 100 identifies that a collision occurs in the RTS transmission and doubles the corresponding contention window value. And, the terminal 100 receives a new random backoff value in the corresponding range and performs contention again. In the case that the doubled contention window value is greater than the maximum contention window value, the terminal 100 set the contention window value to the maximum contention window value again and performs contention with the new backoff value in the corresponding range. At this time, the collided terminal 100 counts the retransmission count whenever collision occurs, and a retransmission is performed within a maximum retransmission count.

Meanwhile, the energy/data sequential transmission/reception step and data transmission step (step S108) is described in detail.

The energy/data sequential transmission/reception step and data transmission step is performed after the terminal 100 receives the CTS from the H-AP 200. In the case that the terminal 100 receives the CTS from the H-AP 200 after sending the DRTS, as shown in FIG. 1, only data transmission is performed to the H-AP 200, and in the case that the terminal 100 receives the CTS after sending the ERTS, as shown in FIG. 10, the energy reception and the data transmission are sequentially performed from the H-AP 200.

Hereinafter, the ACK reception step (step S109) is described.

In the ACK reception step, when the terminal 100 completes the energy reception from the H-AP 200 and the data transmission to the H-AP 200, the terminal 100 receives ACK. When the terminal 100 receives ACK, the terminal 100 selects an RTS type again according to the energy state and performs a channel contention by selecting a corresponding contention window according to the selected RTS type. In the case that the terminal 100 fails to receive ACK, the terminal 100 performs RTS retransmission by using the random backoff value which is obtained by doubling the contention window value up to the maximum contention window value as in the CTS reception step described above, and the retransmission is performed only within the maximum retransmission count.

FIG. 10 is a diagram for describing an operation example of energy/data transmission/reception procedure utilizing a hetero-RTS according to an embodiment of the present disclosure.

When the terminal 100 receives the ERTS, the operation of transmitting energy to the terminal 100 and the operation of receiving data from the terminal 100 may be performed sequentially. Or, it may be performed in reverse order.

FIG. 10 shows an operation example selective energy transmission method according to an embodiment of the present disclosure. Before receiving a backoff value, Device 1 of the terminals 100 and Device 3 of the terminals 100 calculate energy request probability based on the remaining energy and determine to receive energy according to the energy request probability. Device 1 of the terminals 100 and Device 3 of the terminals 100 select ERTS$_l$ and ERTS$_s$ according to $p_{ERTS_l}$ and $p_{ERTS_s}$ which are calculated to select the RTSs of which reception energy amounts are different with each other and select contention window value CW2 for using ERTS$_l$ and ERTS$_s$. In addition, Device 2 of the terminals 100 selects the DRTS used only for data transmission according to the calculate energy request probability and selects contention window value CW1 for using the DRTS. The Device 1 of the terminals 100 that succeeds in the first backoff contention transmits ERTS$_l$ to the H-AP 200 for energy reception and data transmission. The H-AP 200 that receives ERTS$_l$ responds by transmitting ECTS$_l$ to the Device 1 of the terminals 100. Further, the H-AP 200 transmits energy in response to ERTS$_l$ of Device 1 of the terminals 100 and receives data from the terminals 100. Later, the H-AP 200 notifies that energy transmission and data reception are completed through ACK.

Device 2 of the terminals 100 that succeeds in the subsequent contention transmits the DRTS to the H-AP 200 only for data transmission to the H-AP 200, and the H-AP 200 responds by transmitting the DCTS to the Device 2 of the terminals 100. Device 2 of the terminals 100 performs data transmission to the H-AP 200 only in response to the DCTS of the H-AP 200. Later, the H-AP 200 notifies that data is successfully received in Device 2 of the terminals 100 through ACK.

Device 3 of the terminals 100 transmits ERTS$_s$ to the H-AP 200 after succeeding the backoff contention, and the H-AP 200 that receives the ERTS$_s$ responds by transmitting ECTS$_s$ to Device 3 of the terminals 100. Device 3 of the terminals 100 that receives ECTS$_s$ receives smaller amount of energy than the case of using ERTS$_l$ and transmits data sequentially. Later, the H-AP 200 notifies that data is successfully received in Device 3 of the terminals 100 through ACK.

FIGS. 11 to 15 are diagrams for describing an operation procedure of a terminal utilizing a hetero-RTS according to an embodiment of the present disclosure.

In the flowcharts of FIG. 11 to FIG. 15, ①, ②, ③, ④, Ⓐ, Ⓑ, Ⓒ denote flow connection between the connected steps.

In step S201, the terminal 100 designates a retransmission limit value (retry limit) to 7.

In step S202, the terminal 100 designates a retransmission count (retry count) to 0.

In step S203, the terminal 100 checks whether there is data to transmit.

In step S204, the terminal 100 checks whether a channel is occupied during the DIFS. In the case that there is no data to transmit, the terminal 100 terminates the operation.

In step S205, in the case that there is data to transmit, the terminal 100 calculates the energy request probability $p_E$ as represented in Equation 1.

In step S206, the terminal 100 randomly selects an arbitrary number p between 0 and 1 as represented in expression p=rand (0,1).

In step S207, the terminal 100 checks whether the arbitrary number p is $p_E$ or less.

In step S208, unless the arbitrary number p is $p_E$ or less, the terminal 100 selects an RTS as the DRTS.

In step S209, the terminal 100 selects an initial contention window value as $CW_{min}1$.

In step S210, the terminal 100 selects the contention window value as $CW_{min}1$.

In step S211, the terminal 100 calculates an energy reception RTS selection probability $p_{ERTS_l}$ as represented in Equation 2.

In step S212, the terminal 100 randomly selects an arbitrary number p between 0 and 1 as represented in expression p=rand (0,1).

In step S213, the terminal 100 checks whether the arbitrary number p is $p_{ERTS_l}$ or less.

In step S214, unless the arbitrary number p is $p_{ERTS_l}$ or less, the terminal 100 selects an RTS as ERTS$_s$.

In step S215, when the arbitrary number p is $p_{ERTS_l}$ or less, the terminal 100 selects an RTS as ERTS$_l$.

In step S216, the terminal 100 selects an initial contention window value as $CW_{min}2$.

In step S217, the terminal 100 selects the contention window value as $CW_{min}2$.

In step S218, the terminal 100 selects a random backoff value f as represented in expression f=rand (0, CW).

In step S219, the terminal 100 checks whether the random backoff value f is 0.

In step S220, when the random backoff value f is not 0, the terminal 100 checks whether a channel is occupied during the backoff slot time.

In step S221, when the channel is occupied during the backoff slot time, the terminal 100 freezes the random backoff value f.

In step S222, when the channel is not occupied during the backoff slot time, the terminal 100 decreases the random backoff value f by 1 as represented in expression f=f−1.

In step S223, when the random backoff value f is not 0, the terminal 100 checks whether the RTS is the DRTS.

In step S224, when the RTS is the DRTS, the terminal 100 transmits the DRTS to the H-AP 200.

In step S225, the terminal 100 receives the DCTS from the H-AP 200.

In step S226, when the RTS is not the DRTS, the terminal 100 checks whether the RTS is ERTS$_l$.

In step S227, when the RTS is ERTS$_l$, the terminal 100 transmits ERTS$_l$ to the H-AP 200.

In step S228, the terminal 100 checks whether to receive ECTS$_l$ from the H-AP 200.

In step S229, when the terminal 100 receives ECTS$_l$, the terminal 100 receives energy according to energy harvesting type of ERTS$_l$.

In step S230, when the RTS is not ERTS$_l$, the terminal 100 transmits ERTS$_s$ to the H-AP 200.

In step S231, the terminal 100 checks whether to receive ECTS$_s$ from the H-AP 200.

In step S232, when the terminal 100 receives ECTS$_s$, the terminal 100 receives energy according to energy harvesting type of ERTS$_s$.

In step S233, the terminal 100 transmits data to the H-AP 200.

In step S234, the terminal 100 checks whether to receive ACK from the H-AP 200. When the terminal 100 receives ACK, the terminal 100 performs steps from step S202 again.

In step S235, when the terminal 100 does not receive ACK, terminal 100 increases a retransmission count by 1 as represented in expression retry count=retry count+1.

In step S236, the terminal 100 checks whether the retransmission count exceeds the retransmission limit value as represented in expression retry count>retry limit.

In step S237, when the retransmission count exceeds the retransmission limit value, the terminal 100 discards data and performs steps from step S202 again.

In step S238, when the retransmission count does not exceed the retransmission limit value, the terminal 100 doubles the contention window value as represented in expression CW=(CW+1)×2−1.

In step S239, the terminal 100 checks whether the RTS is the DRTS.

In step S240, when the RTS is the DRTS, the terminal 100 checks whether the contention window value CW is the maximum contention window value $CW_{max}1$ or more as represented in expression $CW \geq CW_{max}1$.

In step S241, when the contention window value CW is the maximum contention window value $CW_{max}1$, the terminal 100 selects the contention window value CW as the maximum contention window value $CW_{max}1$.

In step S242, when the RTS is not the DRTS, the terminal 100 checks whether the contention window value CW is the maximum contention window value $CW_{max}2$ or more as represented in expression $CW \geq CW_{max}2$.

In step S243, when the contention window value CW is the maximum contention window value $CW_{max}1$, the terminal 100 selects the contention window value CW as the maximum contention window value $CW_{max}1$.

Later, the terminal 100 performs steps from step S218.

Figure 16:
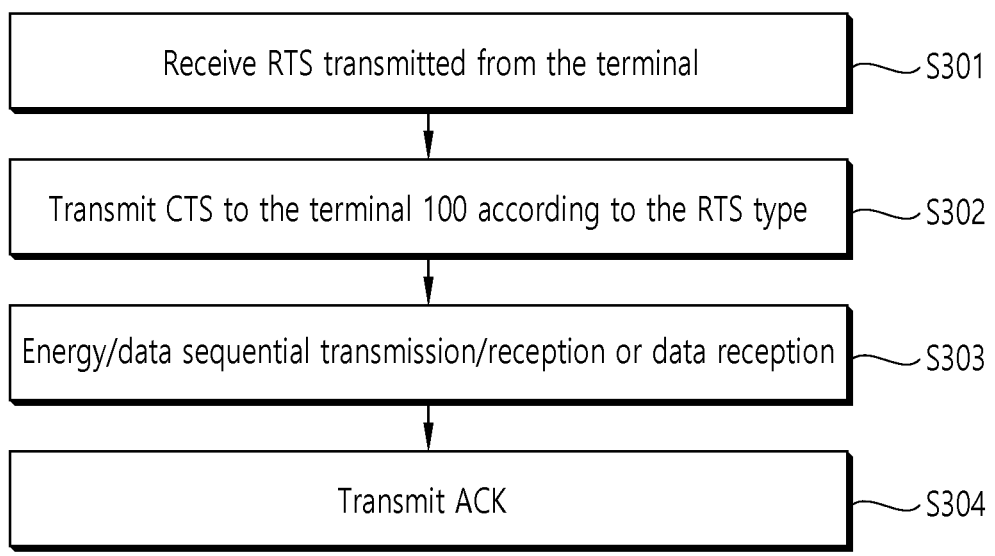
FIG. 16 is a diagram for describing a selective energy transmission method of a hybrid access point (H-AP) in a wireless network according to another embodiment of the present disclosure.

FIG. 16 is a diagram for describing a selective energy transmission method of a hybrid access point (H-AP) in a wireless network according to another embodiment of the present disclosure.

In step S301, the H-AP 200 performs the RTS reception step for receiving the RTS transmitted from the terminal 100.

In step S302, the H-AP 200 performs the CTS transmission step for transmitting the CTS to the terminal 100 according to the received RTS type.

In step S303, the H-AP 200 performs energy/data sequential transmission/reception step and data reception step for transmitting/receiving energy/data sequentially according to the RTS type or receiving data.

In step S304, the H-AP 200 performs ACK transmission step for notifying that data transmitted from the terminal 100 is received.

Hereinafter, an operation of the H-AP 200 is described in detail.

Meanwhile, the RTS reception step (step S301) is described in detail.

In the RTS reception step, the H-AP 200 receives the DRTS or the ERTS transmitted from the terminal 100 that succeeds in the backoff contention based on different contention window value according to the RTS type.

Meanwhile, the CTS transmission step (step S302) is described in detail.

In the CTS transmission step, when the RTS that the terminal 100 that succeeds in the backoff contention transmits to the H-AP 200 is successfully received in the H-AP 200, the H-AP 200 transmits the CTS to the terminal 100. When the H-AP 200 receives the DRTS from the terminal 100, the H-AP 200 transmits the DCTS to the terminal 100, and when the H-AP 200 receives $ERTS_s$ or $ERTS_l$, the H-AP 200 transmits $ECTS_s$ or $ECTS_l$, respectively.

Meanwhile, the energy/data sequential transmission/reception step and data transmission step (step S303) is described.

In the energy/data sequential transmission/reception step and data reception step, the H-AP 200 performs energy/data sequential transmission/reception step and data transmission step according to the type of RTS received from the terminal 100. In the case that the H-AP 200 receives the DRTS from the terminal 100, as shown in FIG. 1, only data reception is performed from the terminal 100. In the case that the H-AP 200 receives the ERTS from the terminal 100, as shown in FIG. 10, the operations of transmitting energy to the terminal 100 and receiving data from the terminal 100 are sequentially performed.

Hereinafter, the ACK transmission step (step S304) is described.

In the ACK transmission step, when the H-AP 200 completes the energy transmission to the terminal 100 and the data reception from the terminal 100, the H-AP 200 transmits ACK. The H-AP 200 transmits ACK to the terminal 100 and informs that transmissions of energy transmitted from the terminal 100 and the data received from the terminal 100 are completed.

Figure 17:
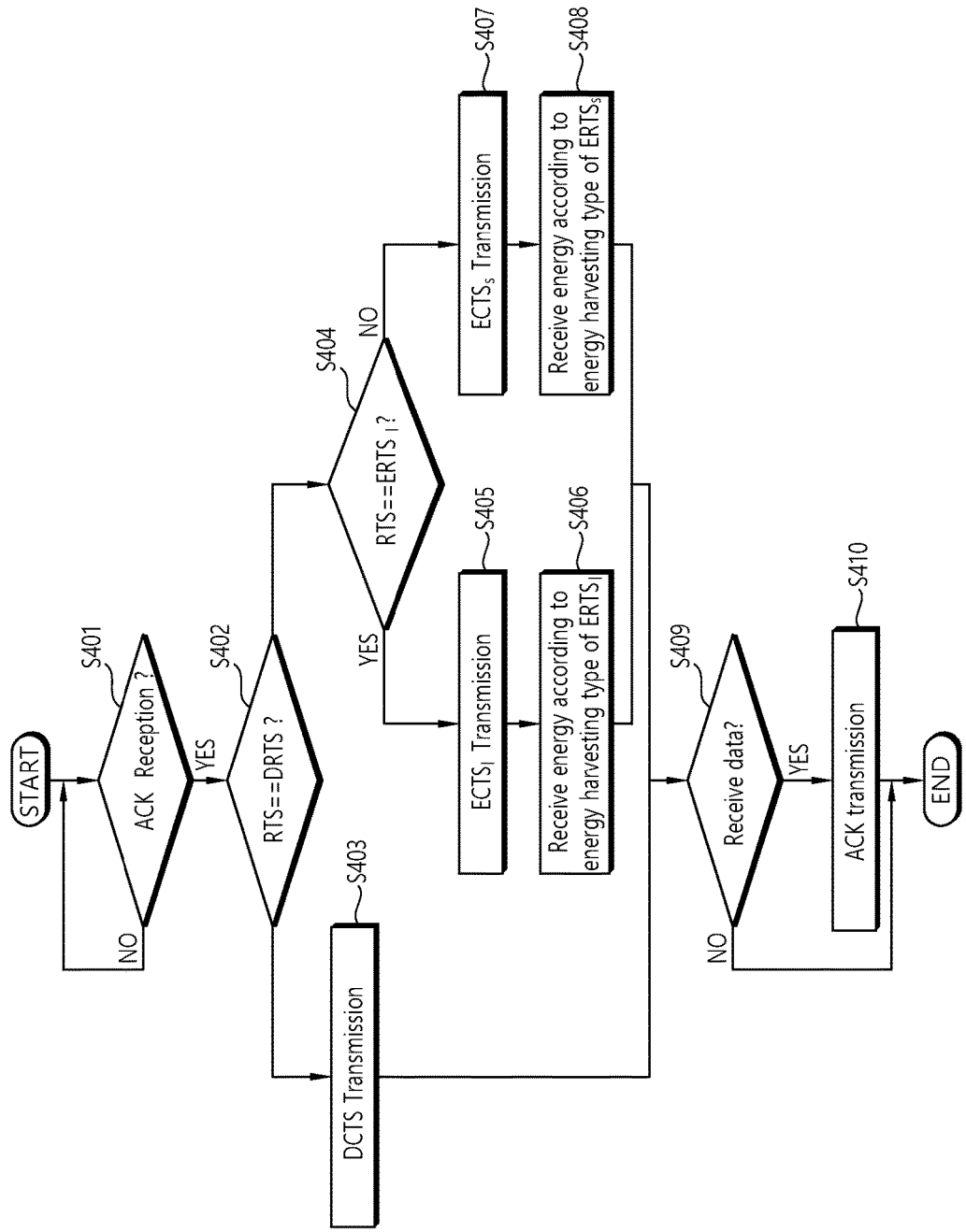
FIG. 17 is a diagram for describing an operation procedure of a hybrid access point utilizing a hetero-RTS according to another embodiment of the present disclosure.

FIG. 17 is a diagram for describing an operation procedure of a hybrid access point utilizing a hetero-RTS according to another embodiment of the present disclosure.

In step S401, the H-AP 200 receives the RTS from the terminal 100.

In step S402, the H-AP 200 checks whether the received RTS is the DRTS.

In step S403, when the received RTS is the DRTS, the H-AP 200 transmits the DCTS to the terminal 100.

In step S404, the H-AP 200 checks whether the received RTS is $ERTS_l$.

In step S405, when the received RTS is $ERTS_l$ the H-AP 200 transmits $ECTS_l$ to the terminal 100.

In step S406, the H-AP 200 transmits energy to the terminal 100 according to the energy harvesting type of $ERTS_l$.

In step S407, when the received RTS is $ERTS_s$, the H-AP transmits $ECTS_s$ to the terminal 100.

In step S408, the H-AP 200 transmits energy to the terminal 100 according to the energy harvesting type of $ERTS_s$.

In step S409, the H-AP 200 checks whether to receive data from the terminal 100.

In step S410, when the H-AP 200 receives data from the terminal 100, the H-AP 200 transmits ACK to the terminal 100. When the H-AP 200 does not receive data from the terminal 100, the H-AP 200 performs steps from step S409.

FIG. 18 is a diagram for describing parameters used in an experiment for comparing transmission data rate in comparison with provided energy between the embodiments of the present disclosure and the comparison method.

Figure 19:
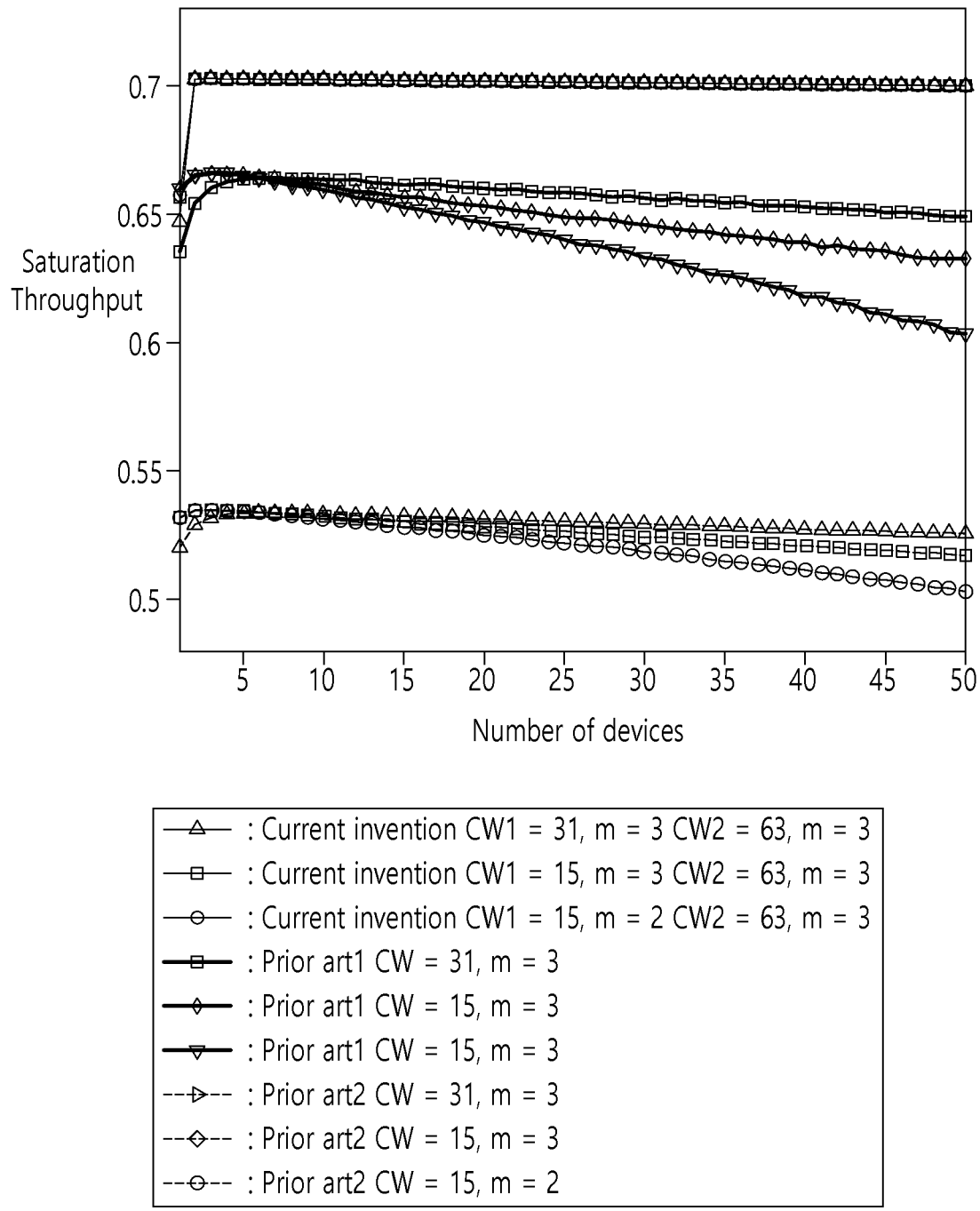
FIG. 19 is a diagram for describing data throughput rate according to the number of terminals in the present disclosure and the prior art.

FIG. 19 is a diagram for describing data throughput rate according to the number of terminals in the present disclosure and the prior art.

FIG. 19 shows a graph representing data throughput rate with increasing the number of terminals 100 from 1 to 50 in the embodiments of the present disclosure, prior art 1 and prior art 2.

To verify the data throughput rate in the embodiments of the present disclosure, the prior art 1 in which only data transmission or only energy reception is performed when channel contention is succeeded based on the energy request probability $p_E$ and prior art 2 in which energy reception is requested from the fixed H-AP 200 in every data transmission are set as a comparison group, and the performance is evaluated.

Table 2 in FIG. 18 represents parameters used in the experiment. In addition, a simulation is performed under the assumption that all terminals 100 have data to transmit always. Furthermore, in the comparison group, the energy harvesting time is set to 6667 μs, and the experiment is performed by disregarding that the energy required to transmit RTS/CTS or ACK is significantly smaller than the energy required for the data transmission or the energy reception.

FIG. 19 is a graph illustrating data throughput rate with increasing the number of terminals 100 from 1 to 50 in the embodiments of the present disclosure and the comparison group (prior art 1 and prior art 2). As the number of terminals increases, the transmission data rate in comparison with energy decreases, and the protocol of the present disclosure shows higher performance than the throughput of other comparison group. That is, according to the selective energy transmission method according to the embodiments of the present disclosure, energy reception is requested according to the remaining energy of the terminal 100 and different amount of energy is received, and more energy is supplied to the terminal 100 that requires energy imperatively, and accordingly, minimum energy transmission is performed. In addition, smaller contention window is used for the terminal 100 in which data transmission of which only channel use time is relatively small is performed and priority of channel contention is provided, and accordingly, data throughput of the terminals 100 is guaranteed.

Figure 20:
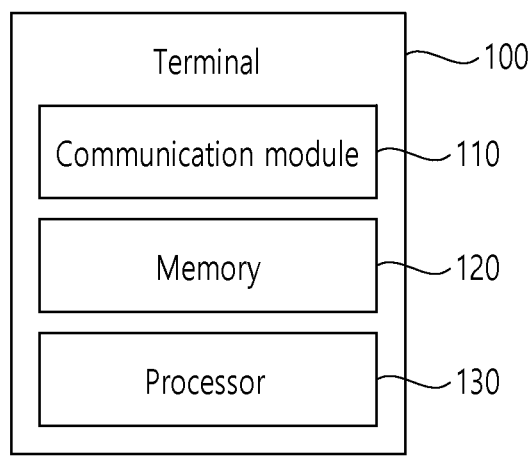
FIG. 20 is a configuration diagram for describing a configuration of a terminal in a wireless network according to another embodiment of the present disclosure.

FIG. 20 is a configuration diagram for describing a configuration of a terminal in a wireless network according to another embodiment of the present disclosure.

As shown in FIG. 20, the terminal 100 in a wireless network according to another embodiment of the present disclosure includes a communication module 110, a memory 120 and a processor 130. However, not all constituent elements shown in the drawing are essential elements. The terminal 100 may be implemented by more constituent elements than the constituent elements shown in the drawing, or the terminal 100 may be implemented by less constituent elements than the constituent elements shown in the drawing.

Hereinafter, the detailed configuration and operation of each element of the terminal 100 of FIG. 20 are described.

The communication module 110 communicates with the hybrid access point. The communication module 110 transmits data to the hybrid access point or receives energy from the hybrid access point.

The memory 120 stores one or more instructions.

The processor 130 executes one or more instructions stored in the memory 120. The processor 130 controls an operation of the communication module 110. By executing one or more instructions, the processor 130 selects a transmission request frame for requesting data transmission or a transmission request frame for requesting data transmission and energy reception based on the remaining energy of the terminal 100, performs a channel contention based on a contention window value through the communication module 110, receives a transmission acknowledgement frame by transmitting the selected transmission request frame to the hybrid access point 200, and transmits data to the hybrid access point 200 or receives energy from the hybrid access point 200 according to the transmitted transmission request frame.

According to the embodiments, the processor 130 may calculate an energy request probability based on the remaining energy of the terminal 100 and select a transmission request frame for requesting data transmission or a transmission request frame for requesting data transmission and energy reception based on the calculated energy request probability.

According to the embodiments, the processor 130 may calculate an energy request probability using a maximum energy amount, a preconfigured energy threshold value and a remaining energy amount of the terminal 100.

According to the embodiments, the processor 130 may calculate an energy request probability in the remaining energy amount of a preconfigured energy threshold value or more to be linearly proportional to the remaining energy amount.

According to the embodiments, the processor 130 may calculate an energy reception amount selection probability for selecting an energy reception amount and select a transmission request frame having any one energy reception amount among at least one energy reception amount based on the calculated energy reception amount selection probability.

According to the embodiments, the processor 130 may select a contention window value according to the selected transmission request frame.

According to the embodiments, the processor 130 may select a contention window value according to a transmission request frame for requesting data transmission and a contention window value according to a transmission request frame for requesting energy reception differently.

According to the embodiments, the processor 130 may select a contention window value according to a transmission request frame having the selected any one energy reception amount.

Figure 21:
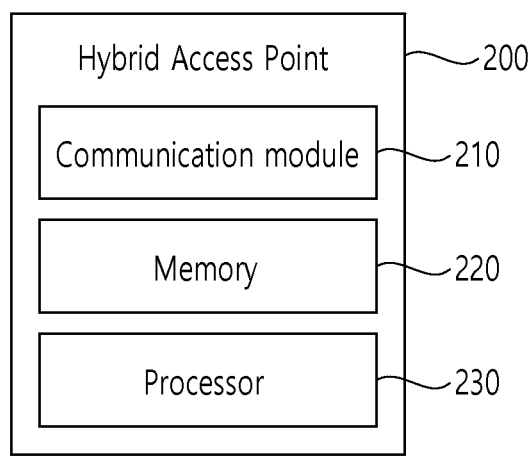
FIG. 21 is a configuration diagram for describing a configuration of a hybrid access point in a wireless network according to another embodiment of the present disclosure.

FIG. 21 is a configuration diagram for describing a configuration of a hybrid access point in a wireless network according to another embodiment of the present disclosure.

As shown in FIG. 21, the hybrid access point 200 in a wireless network according to another embodiment of the present disclosure includes a communication module 210, a memory 220 and a processor 230. However, not all constituent elements shown in the drawing are essential elements. The hybrid access point 200 may be implemented by more constituent elements than the constituent elements shown in the drawing, or the hybrid access point 200 may be implemented by less constituent elements than the constituent elements shown in the drawing.

Hereinafter, the detailed configuration and operation of each element of the hybrid access point 200 of FIG. 21 are described.

The communication module 210 communicates with the terminal 100. The communication module 210 receives data from the terminal 100 or transmits energy to the terminal 100.

The memory 220 stores one or more instructions.

The processor 230 executes one or more instructions stored in the memory 220. The processor 230 controls an operation of the communication module 210. By executing one or more instructions, the processor 230 receives a transmission request frame for requesting data transmission or a transmission request frame for requesting data transmission and energy reception from the terminal 100, selects a transmission request frame according to the received transmission request frame and transmits it to the terminal 100, and receives data from the terminal 100 or transmits energy to the terminal 100 according to the received transmission request frame.

According to the embodiments, through the communication module 210, the processor 230 may select a transmission acknowledgement frame for identifying a data transmission request or a transmission acknowledgement frame for identifying a data transmission request and an energy reception request according to the received transmission request frame and transmits it to the terminal 100.

According to the embodiments, through the communication module 210, the processor 230 may receive a transmission request frame having any one energy reception amount among at least one energy reception amount.

According to the embodiments, through the communication module 210, the processor 230 may select a transmission acknowledgement frame for identifying any one energy reception amount which is received and transmit it to the terminal 100.

The selective energy transmission method according to the embodiments of the present disclosure described above may be implemented with codes readable by a computer in a computer-readable recording medium. The selective energy transmission method according to the embodiments of the present disclosure may be implemented with a computer program command form which can be executed through various computing means and stored in a computer-readable recording medium.

It is provided a computer-readable recording medium in which program for executing the selective energy transmission method according to the embodiments of the present disclosure including selecting a transmission request frame for requesting data transmission or a transmission request frame for requesting data transmission and energy reception based on the remaining energy of the terminal, performing a channel contention based on a contention window value, receiving a transmission acknowledgement frame by transmitting the selected transmission request frame to a hybrid access point, and transmitting data to the hybrid access point or receiving energy from the hybrid access point according to the transmitted transmission request frame.

It is provided a computer-readable recording medium in which program for executing the selective energy transmission method according to the embodiments of the present disclosure including receiving a transmission request frame for requesting data transmission or a transmission request frame for requesting data transmission and energy reception from a terminal, selecting a transmission acknowledgement frame according to the received transmission request frame and transmits it to the terminal, and receiving data from the terminal or transmitting energy to the terminal according to the received transmission request frame.

The computer-readable recording medium includes all kinds of recording media storing data which can be interpreted by a computer system. For example, the computer-readable recording medium may include a Read Only Memory (ROM), a Random-Access Memory (RAM), a magnetic tape, a magnetic disk, a flash memory, an optical data storage device, and the like. In addition, the computer-readable recording medium may be distributed in computer systems connected to a computer network and may be stored and executed as a code readable in a distribution manner.

While the present disclosure has been described with reference to the accompanying drawings and exemplary embodiments, it is to be understood that the disclosure is not limited by the accompanying drawings and embodiments. It will be understood by those skilled in the art that various changes in form and details may be made therein without departing from the spirit and scope of the disclosure as defined by the appended claims.

In particular, the described features may be implemented within digital electronic circuitry, or computer hardware, firmware, or combinations thereof. The features may be implemented in a computer program product embodied in a storage device in a machine-readable storage device, for example, for execution by a programmable processor. Also, the features may be performed by a programmable processor executing a program of instructions for performing functions of the described embodiments, by operating on input data and generating an output. The described features may be implemented in at least one computer programs that can be executed on a programmable system including at least one programmable processor, at least one input device, and at least one output device which are combined to receive data and directives from a data storage system and to transmit data and directives to the data storage system. A computer program includes a set of directives that can be used directly or indirectly within a computer to perform a particular operation on a certain result. A computer program may be written in any form of programming language including compiled or interpreted languages and may be used in any form included as modules, elements, subroutines, or other units suitable for use in other computer environments or independently operable programs.

Suitable processors for execution of the program of directives include, for example, both general-purpose and special-purpose microprocessors, and a single processor or one of multiple processors of other type of computer. In addition, storage devices suitable for implementing the computer program directives and data implementing the described features include, for example, semiconductor memory devices such as EPROM, EEPROM, and flash memory devices, magnetic devices such as internal hard disks and removable disks, magneto-optical disks, and all forms of nonvolatile memories including CD-ROM and DVD-ROM disks. The processor and memory may be integrated within Application-Specific Integrated Circuits (ASICs) or added by ASICs.

While the present disclosure has been described on the basis of a series of functional blocks, it is not limited by the embodiments described above and the accompanying drawings and it will be apparent to those skilled in the art that various substitutions, modifications and variations can be made without departing from the scope of the present disclosure.

The combination of the above-described embodiments is not limited to the above-described embodiments, and various forms of combination in addition to the above-described embodiments may be provided according to implementation and/or necessity.

In the above-described embodiments, the methods are described on the basis of a flowchart as a series of operations or blocks, but the present disclosure is not limited to the order of the operations, and some operations may occur in different orders or at the same time unlike those described above. It will also be understood by those skilled in the art that the operations shown in the flowchart are not exclusive, and other operations may be included, or one or more operations in the flowchart may be omitted without affecting the scope of the present disclosure.

The above-described embodiments include examples of various aspects. While it is not possible to describe every possible combination for expressing various aspects, one of ordinary skill in the art will recognize that other combinations are possible. Accordingly, it is intended that the present disclosure include all alternatives, modifications and variations that fall within the scope of the following claims.

What is claimed is:

1. A selective energy transmission method performed by a terminal in a wireless network, the method comprising:
   selecting a transmission request frame to request data transmission, or a transmission request frame to request data transmission and energy reception based on a remaining energy of the terminal;
   performing a channel contention based on a contention window, wherein the channel contention is performed by selecting a contention window value according to a transmission request frame to request data transmission and a contention window value according to a transmission request frame to request energy reception differently;
   receiving a transmission acknowledgement frame by transmitting the selected transmission request frame to a hybrid access point; and
   transmitting data to the hybrid access point or receiving energy from the hybrid access point according to the transmitted transmission request frame.

2. The method of claim 1, wherein the selecting of the transmission request frame includes:
   calculating an energy request probability based on the remaining energy of the terminal; and
   selecting the transmission request frame to request data transmission or the transmission request frame to request data transmission and energy reception based on the calculated energy request probability.

3. The method of claim 2, wherein the calculating of the energy request probability includes:
   calculating the energy request probability using a maximum energy amount, a preconfigured energy threshold value and the remaining energy amount of the terminal.

4. The method of claim 2, wherein the calculating of the energy request probability includes:
   calculating an energy request probability in the remaining energy amount of a preconfigured energy threshold value or more to be linearly proportional to the remaining energy amount.

5. The method of claim 1, wherein the selecting of the transmission request frame includes:

calculating an energy reception amount selection probability to select an energy reception amount; and selecting a transmission request frame having any one energy reception amount among at least one energy reception amount based on the calculated energy reception amount selection probability.

6. The method of claim 5, wherein the performing of the channel contention includes:

selecting a contention window value according to the selected transmission request frame having the selected any one energy reception amount.

7. The method of claim 1, wherein the performing of the channel contention includes:

selecting a contention window value according to the selected transmission request frame.

8. A selective energy transmission method performed by a hybrid access point in a wireless network, the method comprising:

receiving a transmission request frame to request data transmission or a transmission request frame to request data transmission and energy reception from a terminal, wherein the received transmission request frame is transmitted by the terminal performing a channel contention based on a contention window, and wherein the channel contention is performed by selecting a contention window value according to a transmission request frame to request data transmission and a contention window value according to a transmission request frame to request energy reception differently;

selecting a transmission acknowledgement frame according to the received transmission request frame and transmitting the transmission acknowledgement frame to the terminal; and receiving data from the terminal or transmitting energy to the terminal according to the received transmission request frame.

9. The method of claim 8, wherein the selecting of the transmission acknowledgement frame and transmitting the transmission acknowledgement frame to the terminal includes:

selecting a transmission acknowledgement frame to identify a data transmission request or a transmission acknowledgement frame to identify a data transmission request and an energy reception request according to the received transmission request frame and transmitting the transmission acknowledgement frame to the terminal.

10. The method of claim 8, wherein the receiving of the transmission request frame includes:

receiving a transmission request frame having any one energy reception amount among at least one energy reception amount.

11. The method of claim 6, wherein the selecting of the transmission acknowledgement frame and transmitting the transmission acknowledgement frame to the terminal includes:

selecting a transmission acknowledgement frame to identify any one energy reception amount which is received and transmit the transmission acknowledgement frame to the terminal.

12. A terminal in a wireless network, the terminal comprising:

a communication module, configured to transmit data or receive energy; and a processor, configured to control an operation of the communication module, wherein the processor is configured to:

select a transmission request frame to request data transmission or a transmission request frame to request data transmission and energy reception based on a remaining energy of the terminal;

perform a channel contention based on a contention window, wherein the channel contention is performed by selecting a contention window value according to a transmission request frame to request data transmission and a contention window value according to a transmission request frame to request energy reception differently;

receive a transmission acknowledgement frame by transmitting the selected transmission request frame to a hybrid access point; and transmit data to the hybrid access point or receive energy from the hybrid access point according to the transmitted transmission request frame.

13. The terminal of claim 12, wherein the processor is configured to calculate an energy request probability based on the remaining energy of the terminal and select the transmission request frame to request data transmission or the transmission request frame to request data transmission and energy reception based on the calculated energy request probability through the communication module.

14. The terminal of claim 12, wherein the processor is configured to calculate an energy reception amount selection probability to select an energy reception amount, and select a transmission request frame having any one energy reception amount among at least one energy reception amount based on the calculated energy reception amount selection probability.

15. The terminal in a wireless network of claim 14, wherein the processor is configured to select a contention window value according to the selected transmission request frame having the selected any one energy reception amount.

16. The terminal of claim 12, wherein the processor is configured to select a contention window value according to the selected transmission request frame.

17. A hybrid access point in a wireless network, the hybrid access point comprising:

a communication module, configured to receive data or transmit energy; and a processor, configured to control an operation of the communication module, wherein the processor is configured to:

receive a transmission request frame to request data transmission or a transmission request frame to request data transmission and energy reception from a terminal, wherein the received transmission request frame is transmitted by the terminal performing a channel contention based on a contention window, and wherein the channel contention is performed by selecting a contention window value according to a transmission request frame to request data transmission and a contention window value according to a transmission request frame to request energy reception differently;

select a transmission acknowledgement frame according to the received transmission request frame and transmit the transmission acknowledgement frame to the terminal; and receive data from the terminal or transmit energy to the terminal according to the received transmission request frame.

18. The hybrid access point of claim 17, wherein the processor is configured to select a transmission acknowledgement frame to identify a data transmission request or a transmission acknowledgement frame to identify a data transmission request and an energy reception request according to the received transmission request frame and transmit it to the terminal through the communication module.

* * * * *